US006687720B1

(12) United States Patent (10) Patent No.: US 6,687,720 B1
Colver et al. (45) Date of Patent: Feb. 3, 2004

(54) PERCENTAGE AND AVERAGE CALCULATOR WITH EXPANDED DISPLAY

(75) Inventors: Dean Colver, Jacksonville Beach, FL (US); David L. Simmons, 1211 Douglass La., Sevierville, TN (US) 37876; Peter House, Jacksonville, FL (US)

(73) Assignee: David L. Simmons, Sevierville, TN (US)

( * ) Notice: Subject to any disclaimer, the term of this patent is extended or adjusted under 35 U.S.C. 154(b) by 497 days.

(21) Appl. No.: 09/654,692

(22) Filed: Sep. 5, 2000

(51) Int. Cl.[7] .................................................. G06F 3/00
(52) U.S. Cl. ..................................................... 708/162
(58) Field of Search ................................ 708/160–162, 708/168–169

(56) References Cited

U.S. PATENT DOCUMENTS

| | | | | | |
|---|---|---|---|---|---|
| 4,048,484 | A | * | 9/1977 | Brittan | 708/162 |
| 4,118,783 | A | * | 10/1978 | Collins | 708/162 |
| 4,282,580 | A | * | 8/1981 | McGuire et al. | 708/162 |
| 6,574,646 | B1 | * | 6/2003 | Campbell | 708/162 |

* cited by examiner

Primary Examiner—Tan V. Mai
(74) Attorney, Agent, or Firm—M. Alex Brown, Esq.

(57) ABSTRACT

A grade list and averaging, hand-held calculator is disclosed for use by teachers and others in quickly determining the numeric grade of a test-exam, or equal parts constituting a 'whole' to be analyzed, and the average of past numeric grades. In the determination of the numeric grade of a test-exam, for example, the calculator allows the entry of the total number of problems on the test, and, corresponding to this total number of problems, displays first and additional lists of potential numeric percentage grades correlating to respective first and additional ranges of problems wrong within the original number of problems on a test entered into the calculator. Each of the first and additional lists are displayed simultaneously as multiple numeric grades, one after the other on the display of the calculator. In one embodiment, ten potential grades are viewed simultaneously. The teacher can quickly scroll through the list of grades and corresponding range of problems wrong, and determine the actual grade by correlating one of the range of problems wrong with its corresponding simultaneously presented numeric percentage grade in the list of grades displayed. In the determination of the average of past numeric grades, the calculator allows the entry of the grades and computes the average of the grades. The calculator keeps a list of the grades in memory for easy editing and constantly updates the display with a new grade average as grades are added or deleted form the list. Other preferred embodiments of the calculator offer calculating, and calculating and/or clock/timer/alarm mode functions. The user can scroll up and down respective grade lists in the Grading and Averaging Modes of the invention.

41 Claims, 15 Drawing Sheets

DisplayGradeList Subroutine

"Probs" Key Pressed

"Scroll Down" Key Pressed

"Scroll Up" Key Pressed

"Avg Mode" Key Pressed

"Scroll Up" Key Pressed

"Scroll Down" Key Pressed

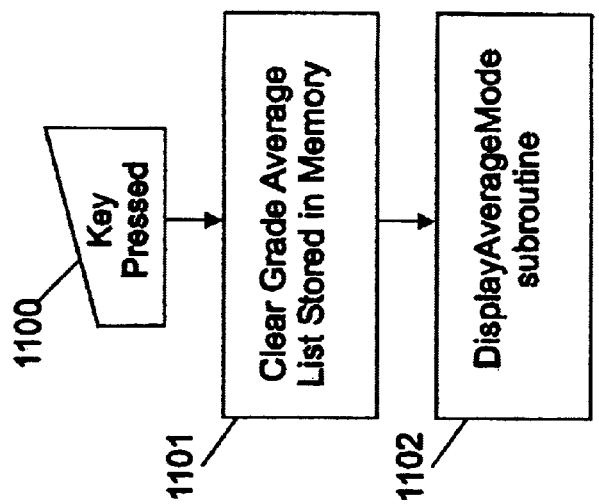
FIG. 11 "Clear Average" Key Pressed
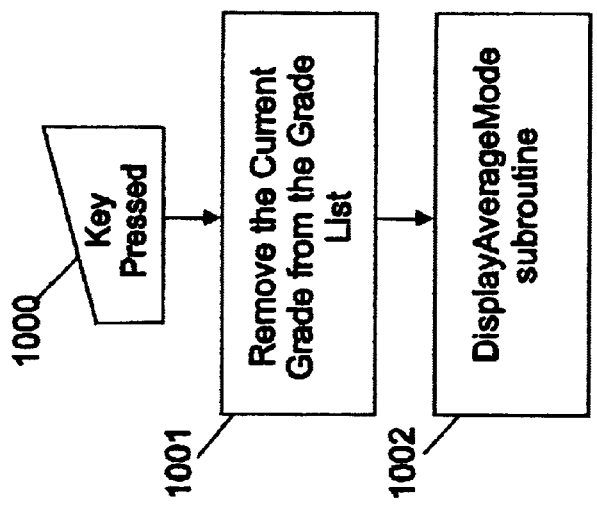
FIG. 10 "Delete Grade" Key Pressed
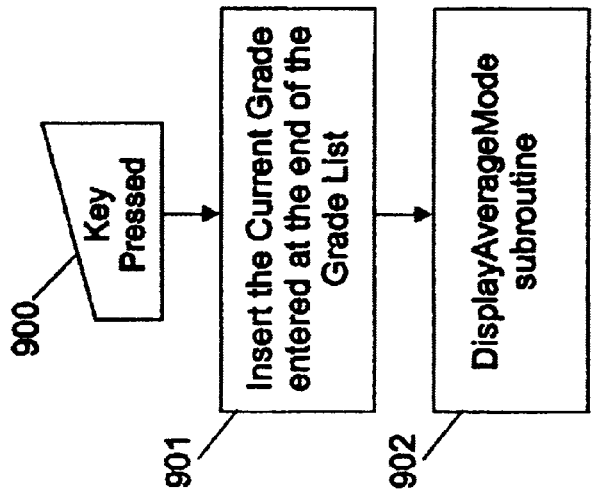
FIG. 9 "Enter Grade" Key Pressed Functional Block Diagram

PERCENTAGE AND AVERAGE CALCULATOR WITH EXPANDED DISPLAY

FIELD OF THE INVENTION

The present invention relates to a mobile calculating device, utilizing aa scrolling accessible feature, to provide number and test grading display information, and relates to a calculating device or assembly which can also provide number and grade averaging features, along with other number calculator functions, and display and timing features.

BACKGROUND INFORMATION

Although no references were found specifically relating to the present invention, especially with regard to its function of scrolling number and test-grading information; those references typical of other marginally related prior art found in the process of a patent search include U.S. Pat. Nos. to Brittan, U.S. Pat. No. 5,233,552; Collard, U.S. Pat. No. 4,868,772; Mcguire et al., U.S. Pat. No. 4,282,580; Brittan, U.S. Pat. No. 4,048,484; Brittan, U.S. Pat. No. 4,715,011; Collins, U.S. Pat. No. 4,118,783; and Lemmons, U.S. Pat. No. 3,691,651.

Additionally, published and/or copyrighted works found, include: (1) "The E-Z GRADER", published by The E-Z Grader Company, Box 24040, Cleveland, Ohio 44124, Copyright, 1971 by R. F. Warner; (2) "Long Ranger E-Z Grader", distributed by the E-Z Grader Company, Box 23608, Chagrin Falls, Ohio 44023, Copyright 1968 by E-Z Grader Company, and 1994 by B. C. Richards; and (3) "INSTANT GRADER"™, Copyright 1989 by Incentive Publications, Inc., Nashville, Tenn.

Specifically, the Brittan patent references '552, and '011, disclose, a hand-held calculator of the type used by teachers in averaging grades, and a calculator for use by teachers for converting numeric scores into letter grades; respectively.

Brittan '552 discloses and claims a grade-averaging calculator for use by teachers in averaging a sequence of intermixed letter grades and numeric grades. This invention comprises letter means for inputted letter grades; numeric means for inputted numeric grades, and conversion means for converting either all of the inputted letter grades or all of the inputted numeric grades into a format enabling the numeric grades and the letter grades to be commonly processed this invention also includes a processor means for calculating an average of a sequence of inputted and converted letter and numeric grades.

Brittan '011 discloses and claims a calculator for use by teachers for converting numeric scores into student letter grades. This invention comprises means for inputting a high numeric standard and a low numeric standard, means for calculating numeric ranges between the high and low numeric standards, where each range will correspond to a letter grade; means for inputting a student numeric score; means for determining the numeric range encompassing the student numeric score and for determining the corresponding student letter grade; and display means for displaying the corresponding student letter grade in singular fashion. The apparent thrust of this invention is for this calculator to automatically establish appropriate letter grades bases on given maximum and minimum numeric scores. The teacher, in this case, inputs the maximum and minimum scores into this calculator and thereafter inputs the individual student numeric scores. This calculator responds by assigning each numeric score a letter grade as determined by the internal grading curve or numeric ranges, set up.

The display features of the Brittan '552 and '011 references, provide only for single number section, a single GPA-number section, and a single letter-grade section; and distinguish and set forth number and display information in a substantially different manner, structurally and functionally, in light of the present invention.

Brittan '484 discloses a Digital Grade Averager or digital calculator adapted for use by teachers in averaging a plurality of grades. It employs a key board of letter grades, and numbers 0 to 13, a regular calculator chip, circuitry for decoding a letter grade from the digital output when letter grades are entered and after the grades are averaged; and a disclosed counter to keep track of the grades entered. This calculator also permits regular arithmetic computations.

McGuire '580 simply reflects a Pocket Calculator With Grade Averaging Function; a hand-held calculator having a keyboard, visual display, microprocessor and power source. Its microprocessor has a program that enables one to enter a sequence of letter grades through the keyboard, and compute a running average of the sequence. The current result of the average is visually displayed. The display format of this invention is apparently provided with eight (8) available, single display entry locations or positions. Its first two locations are utilized to display a letter grade, and positive/negative if applicable. Its next four positions are employed for counting the number of papers or grades being considered toward the final average. Its next position is inoperative as a separator or power indicator; and its final position is displays either "S" or "T", for its register read out, either its 'subtotal' or 'total'. This play format is in vast distinction, structurally and functionally, to that of the present invention. Additionally, McGuire's program enables one to calculate running averages of subsequences of grades simultaneously with the overall sequence average, such that grade averages for individual students can be computed at the same time that the overall average of all students is being computed. Maguire's distinguishable display is tied to this function.

Collins '783 sets forth a Digital Grade Averager, a calculator, for use by teachers, which adds letter grades, with or without +/− designation; average those grades in terms of their numerical equivalents; and displays the average grade and the number of grades averaged. Input and display, and its structure and function, in light of the present invention is vastly different.

The Lemmons '651 patent and the above referenced, published printed matter or devices; set forth means of obtaining the averaging of grades, or a final test score, based on the number of problems of a given test, and the number of problems wrong as to each student. Although some functional similarity exists in reference to the overall prior art and the present invention, the means employed, and endemic structure and function is vastly different from the present invention.

None of the references found in the prior art specifically illustrate or disclose the Grading Display And Averaging Calculator Assembly of the present invention. Nor is the present invention obvious in view of any of the prior art references listed. In addition, all of the relevant prior art heretofore known suffer from a number of disadvantages.

None of the prior art devices or methods of their use address providing a display setting forth a multiple number of numeric grades based on the number of problems on a given test, or parts existing within a given whole; and the range within which the number wrong on a test (or the parts being taken away form the whole) falls within.

Also, none of the prior art calculator devices offer the programming, calculation and connected display features, which present a multiple number of grades, within which the correct grade for a given test-taker will exist, which are in close positional relationship to one another, such as in a horizontal, vertical or other linear sequence in relationship to one another.

Additionally, other calculator devices in the prior art do not present or disclose a calculator device which concurrently sets forth the number of problems on an exam, the range of problems wrong within which the actual number wrong for a given student exists, and a multiple, consecutive series of positionally adjacent grade possibilities based on the problems wrong in the exam and the number of problems on an exam; all of which is presented at one time on an expanded display.

In this regard, the prior art further does not provide a hand-held calculator which easily and contemporaneously displays a list of potential grades based on the number of problems missed on an exam or test.

Also, other calculator devices do not have the ability to show multiple potential numeric grades simultaneously.

Additionally, the prior art devices fail to provide a method or process, or one which is adequately suitable; for adding, editing and deleting grades from a stored list of grades while concurrently displaying their prevailing average.

The prior art also fails in providing a user-friendly key board system of input keys to properly manage the functions of presenting possible test grade scores, presenting averaging information, while also providing means for easily inputting information for normal calculation purposes and timing and alarm functions.

In this regard, the prior art also fails to, otherwise, easily provide all of these functions in one hand-held calculator device.

These and other disadvantages, structurally and functionally, of the prior art, will become apparent in reviewing the remainder of the present specification, claims and drawings.

Accordingly, it is an object of the present invention to allow the easy and orderly display and selection of a grade from a list of grades based on the number of problems missed on a test or exam (or parts missing from any given whole in any such similar percentage analysis); and, through expanded and novel display means to display a list of potential grades based on the number of problems missed in a given text/exam (or similar) situation.

In preferred embodiments of the invention herein it is the object of the invention to provide a unique display to show a multiple list of 10 (ten) potential numeric grades (or such other multiple number of grades) in a horizontal or linear (or positionally adjacent/proximate) fashion simultaneously and concurrently.

A further object of the invention exists herein to present an expanded display which includes information as to the grade list discussed above, along with positionally adjacent display information regarding the number of problems or questions on an exam/test (or part constituting the subject whole); and, concurrently, the range of problems which includes the actual number of problems that a given student may have wrong. In this regard, another related object of the present calculator invention is to present, structurally, functionally, and by virtue of novel programming and microprocessor means, the ability within the present inventions Grade Test Mode, to easily 'Scroll' up and down in a given list of grades by virtue of scrolling to a given 'range' of grades, within which the actual grade wrong, is thought to exist.

Yet another object of the invention is to provide a grading and averaging calculator, with an expanded more comprehensive display means; which also provides a easy and unique way, means or method for adding, editing and deleting grades from a stored list of grades being considered for averaging purposes; while concurrently displaying their prevailing or overall average. In this regard it is the object to present, within this Mode as well, the easy functional capability to 'Scroll' up and down a list of such grades being considered for averaging purposes.

Another object of the present invention, in preferred embodiments thereof, is to present an expanded display capable of presenting a multiple grade list, in adjacent consecutive order and position in relation to each of the grades presented, the range or number of problems wrong (within a group or range of such problems wrong) and the actual number of problems on an exam; such, that each of these functional elements can be functionally and structurally activated by a single microprocessor means which contains, within itself, memory, display driver (controller), arithmetic logic unit and clock/timer functions; within and part of which special programmed functions can facilitate the advantages of the invention.

It will, therefore, be understood that substantial and distinguishable structural and functional advantages are realized in the present invention over the prior art devices; and that the present invention's novel and efficient structure, diverse use and utility and broad functional applications serve as important bases of novelty and distinction over the prior art in this regard.

SUMMARY OF THE INVENTION

The foregoing and other objects of the invention can be achieved with the present invention, assembly, device and method of use, which is a scrollable grading and averaging calculator. The invention is utilized for the determination of a numeric grade of a test-exam and for the determination of the overall average of a compiled list of numeric grades, while also providing mathematical calculating and memory storage functions. The invention is provided with microprocessing means for providing memory, arithmetic logic, display driver and further internal functions. The microprocessing means is programmed in a permanent grade list mode to analyze a number of problems on text-exam entered therein, and to contemporaneously provide first and further ranges of number of problems wrong and first and further grade lists setting forth a numerical grade corresponding to each respective number of problems wrong in the range of number of problems wrong, while facilitating the ability to scroll up and down, in terms of numerical value, through each of the ranges and the grade lists corresponding thereto. The microprocessing means is further programmed in an averaging mode to compile, through adding, deleting and editing, a list of grades to be averaged, while setting forth a resulting overall average, and facilitating the ability to scroll up and down, in terms of the index number assigned to a grade, through the respective grades of the list of grades compiled. The microprocessing means is further programmed in a calculator mode to carry out common mathematical operations and to store numeric values. The microprocessing means is also programmed to singularly activate and utilize the grade list mode, the averaging mode and the calculator mode. The calculator of the invention is further provided with entry means comprising a plurality of key pads, identified, circuited and functionally interfaced in relation to the microprocessing means to activate and utilize the programmed grade list mode, averaging mode and calculator mode, for analysis and display purposes. The invention is also provided with an expanded display means which is functionally interfaced with the microprocessing means; for displaying, in the grade list mode, the number of problems on a test-exam and the first and further ranges of number of problems wrong, and for displaying, as corresponding to each respective range of problems wrong, the first and further grade lists. Each of the grade lists is displayed so that each respective grade is positionally adjacent in relation to the next respective grade, in sequence, in the grade list, as displayed on the expanded display means. The expanded display means further indicates each of the grade lists, scrolled to, while contemporaneously indicating the range of number of problems wrong, corresponding thereto, and the number of problems on a test-exam. The expanded display means of the invention is also utilized for displaying, in the averaging mode, the respective grade and the corresponding index number of each of the grades compiled on a list of grades to be averaged, while contemporaneously setting forth and displaying the overall average of the list of grades then entered. The expanded display means also displays and indicates each of the respective grades scrolled to in the averaging mode. The expanded display means is further utilized in the invention for displaying in the calculator mode, the numeric values entered for arithmetic operation, the resulting numeric value and the memory status of a numeric value entered, deleted or recalled from memory storage. The calculator of the present invention is further provided with housing and power means for the support and activation (electric or otherwise) of the microprocessing means, the entry means and the expanded display means of the scrollable grading and averaging calculator of the present invention.

BRIEF DESCRIPTION OF THE DRAWINGS

FIG. 9 is an exemplar flow chart illustrating the "Enter Grade" Key Pressed Subroutine as it relates to the Display Average mode subroutine in preferred embodiments of the calculator of the present invention.

FIG. 10 is an exemplar flow chart illustrating the "Delete Grade" Key Pressed Subroutine as it relates to the Display Average mode Subroutine of the present invention.

FIG. 11 is a flow chart illustrating the "Clear Grade" Key Pressed Subroutine as it relates to preferred embodiments of the Averaging Mode of the calculator of the present invention.

DETAILED DESCRIPTION OF THE PREFERRED EMBODIMENTS OF THE INVENTION

Figure 1:
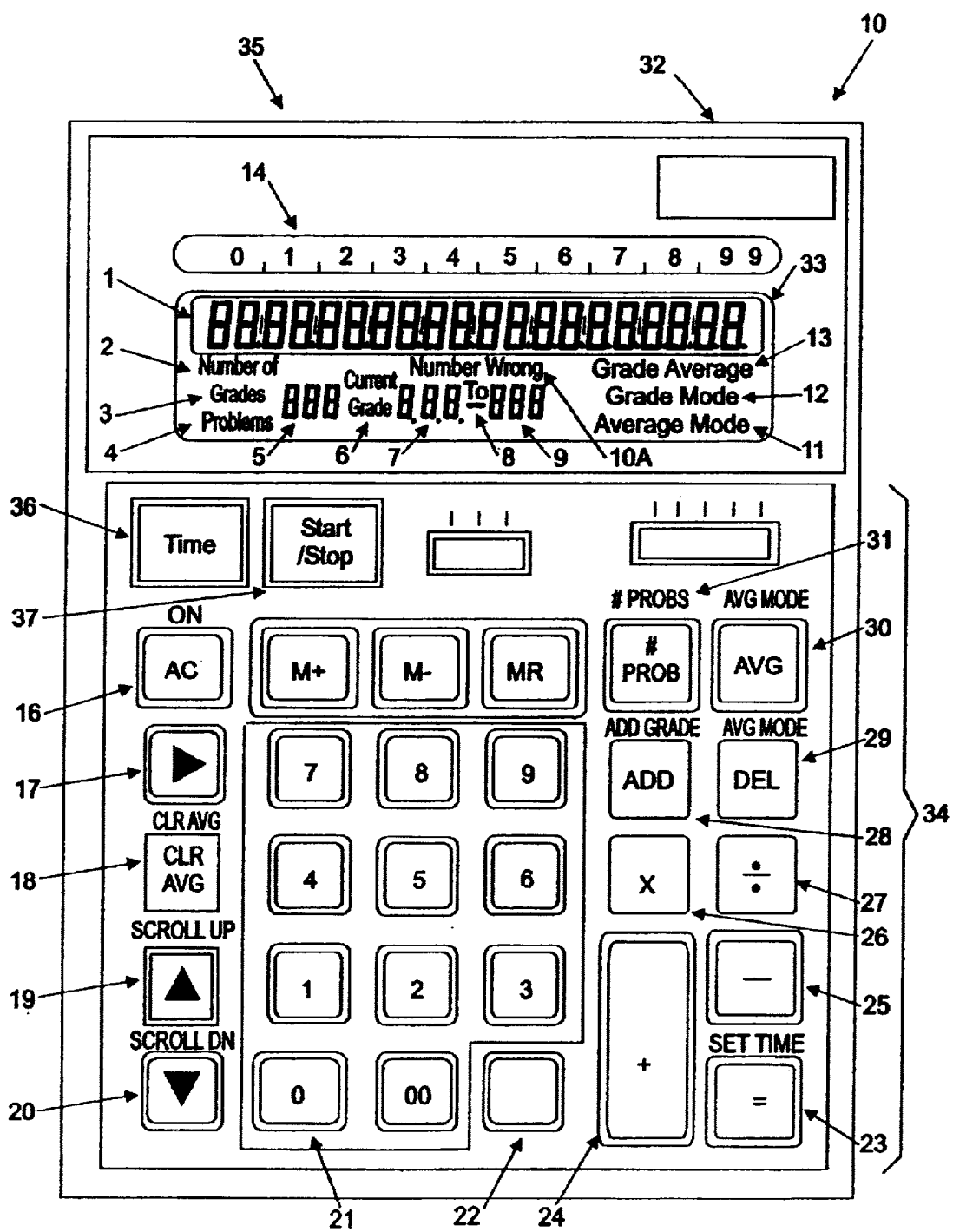
FIG. 1 is a top plan view of one embodiment of the Scrollable Grading/Percentage and Averaging Calculator With Expanded Display, of the present invention.

The following description of the preferred embodiments of the concepts and teaching of the present invention is made in reference to the accompanying drawing figures which constitute preselected illustrated examples of the structural and functional elements of the invention, among many other examples existing within the scope and spirit of the invention.

Referring now to the drawings, FIGS. 1, 1A, 12 and 13, thereof, there is shown a percentage and average calculator with expanded display 10, of the present invention, referred to herein as the "Calculator" 10.

The Calculator 10 includes the housing 32, keypad assembly 34, and the expanded display 33. The display 33 is provided with a plurality or multiplicity of number display fields, which in a preferred embodiment of the calculator 10, is illustrated as the first number display field 1, the second number display field 5, the third number display field 7, and the fourth number display field 9.

The expanded display 33 is also provided with text message segments 2, 3, 4, 6, 8, 10A, 11, 12, and 13, also referred to herein as indicia segments. These test message segments or indicia segments, just referenced above, can be created, fabricated, or placed on the surface of the expanded display 33, or inserted, placed or constructed within a layer or laminated section or layer of the display 33, or below the outward surface of the display 33, as will be understood to be within the scope and spirit of the invention. The text message segments will be set out, as indicated and illustrated in the drawings, to facilitate the identification of the various modes of the calculator 10 to be described below herein.

Figure 12:
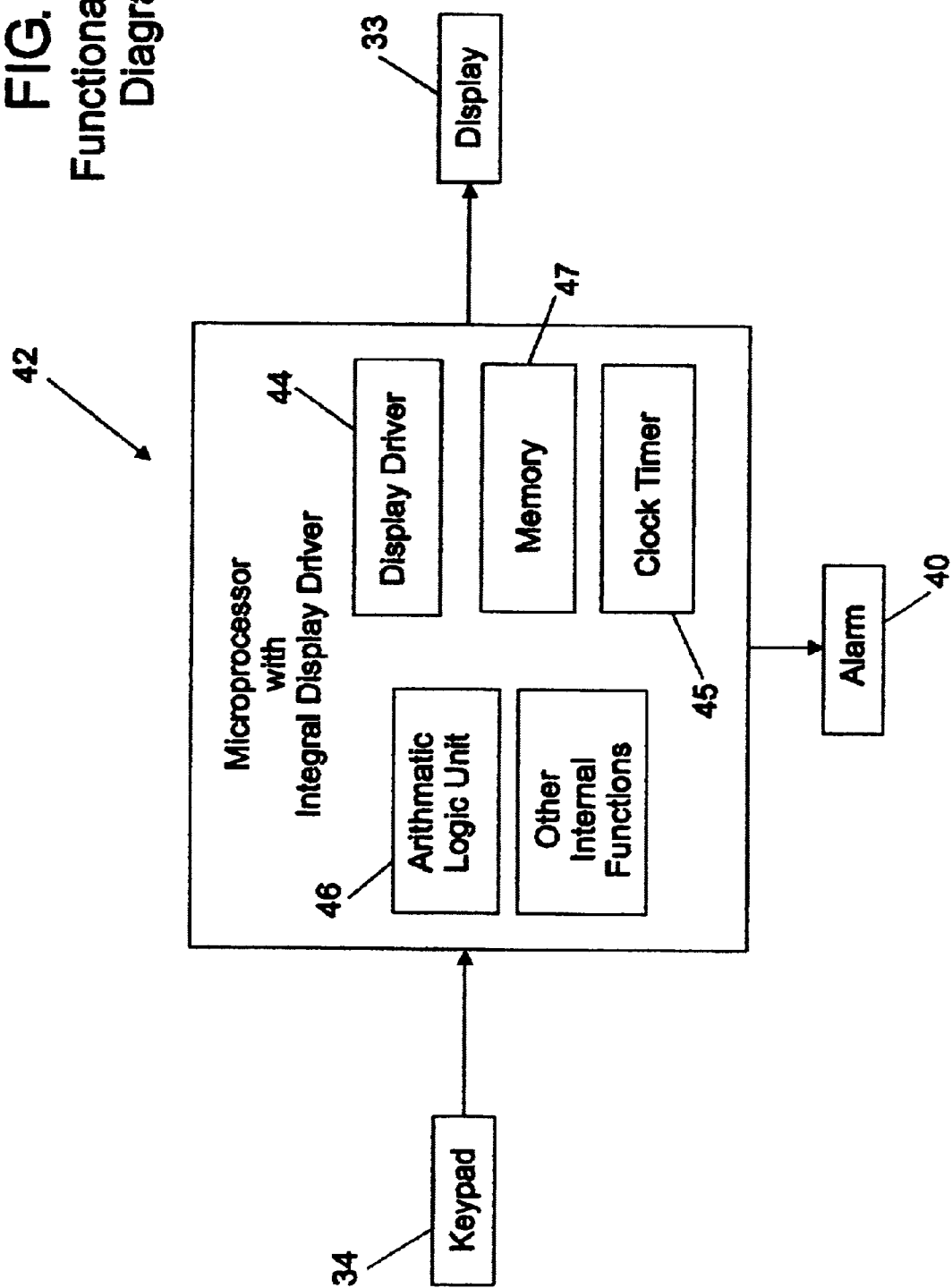
FIG. 12 is an exemplar, functional block diagram of a preferred embodiment of the calculator of the present invention.

The calculator 10 is illustrated in block form in FIG. 12. The keypad 34, the display 33, and the alarm 40, are all connected (and functionally interfaced) with the processor 42. The processing and/or conversion functions described herein are carried out by the processor 42. as are the memory/storage functions. The processor 42 also contains an integral display driver 44 which formats and delivers information directly to the display 33. An external (i.e., external to the processor 42) display driver chip or element is not required in preferred embodiments of the invention, although in certain other preferred embodiments of the invention, it can be utilized. The advantage, however, in preferred embodiments of the invention, is to utilize one microprocessor chip to accommodate the referenced functions. The function of the clock/timer 45 within the processor 42 can be set to provide 'current time' information to the display 33, or be utilized to provide information to the display 33 as a 'count down timer'. Also, the alarm 40 can be set to alert the operator or user of the calculator 10, at a specific selected time or at the end of a 'count down period'.

Figures 14, 14A:
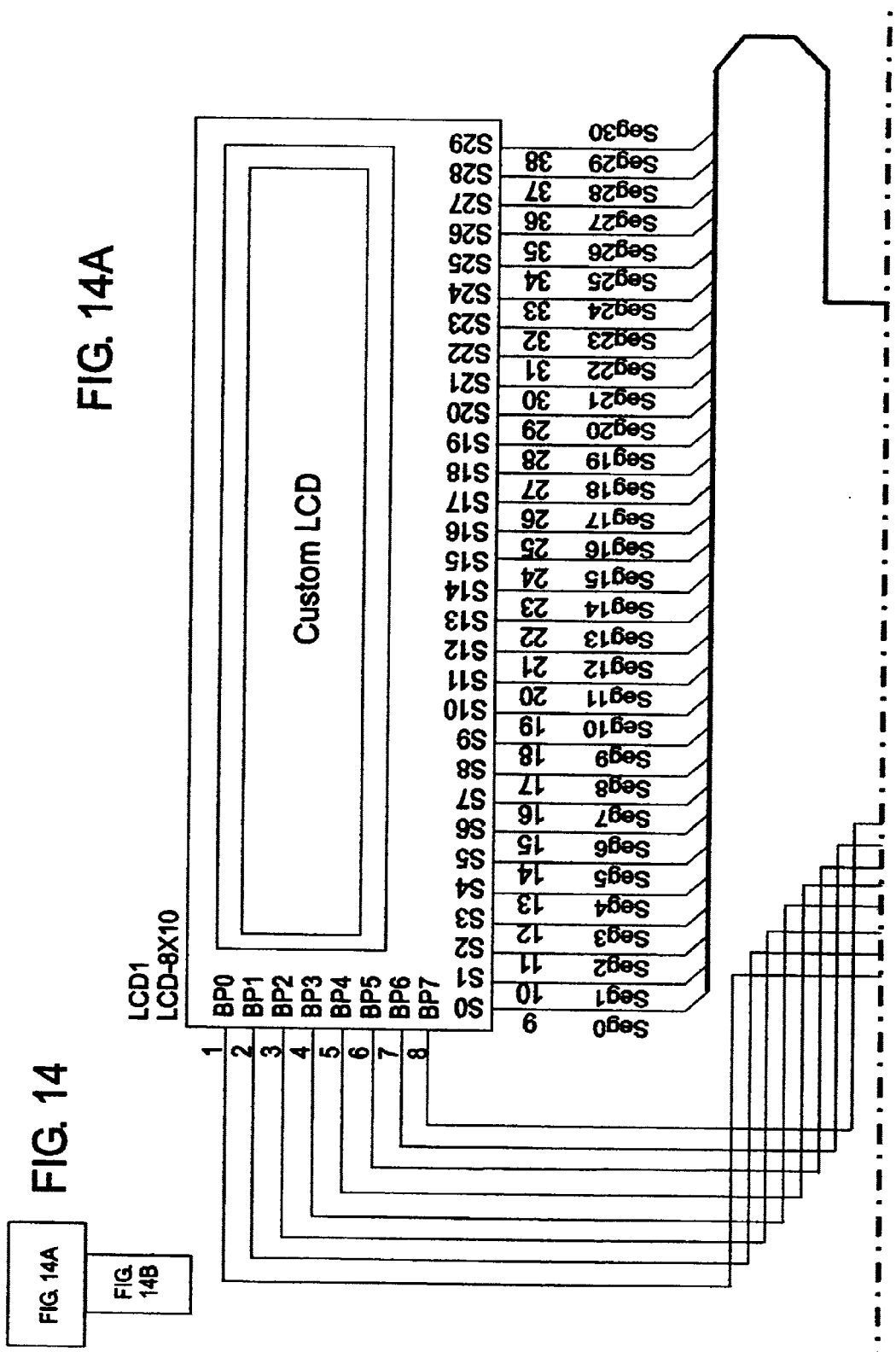
FIG. 14 is an exemplar electric schematic view of one of a number of examples of the utilization within the scope of the invention of an LCD and LCD Driver (or Controller).
Figure 14B:
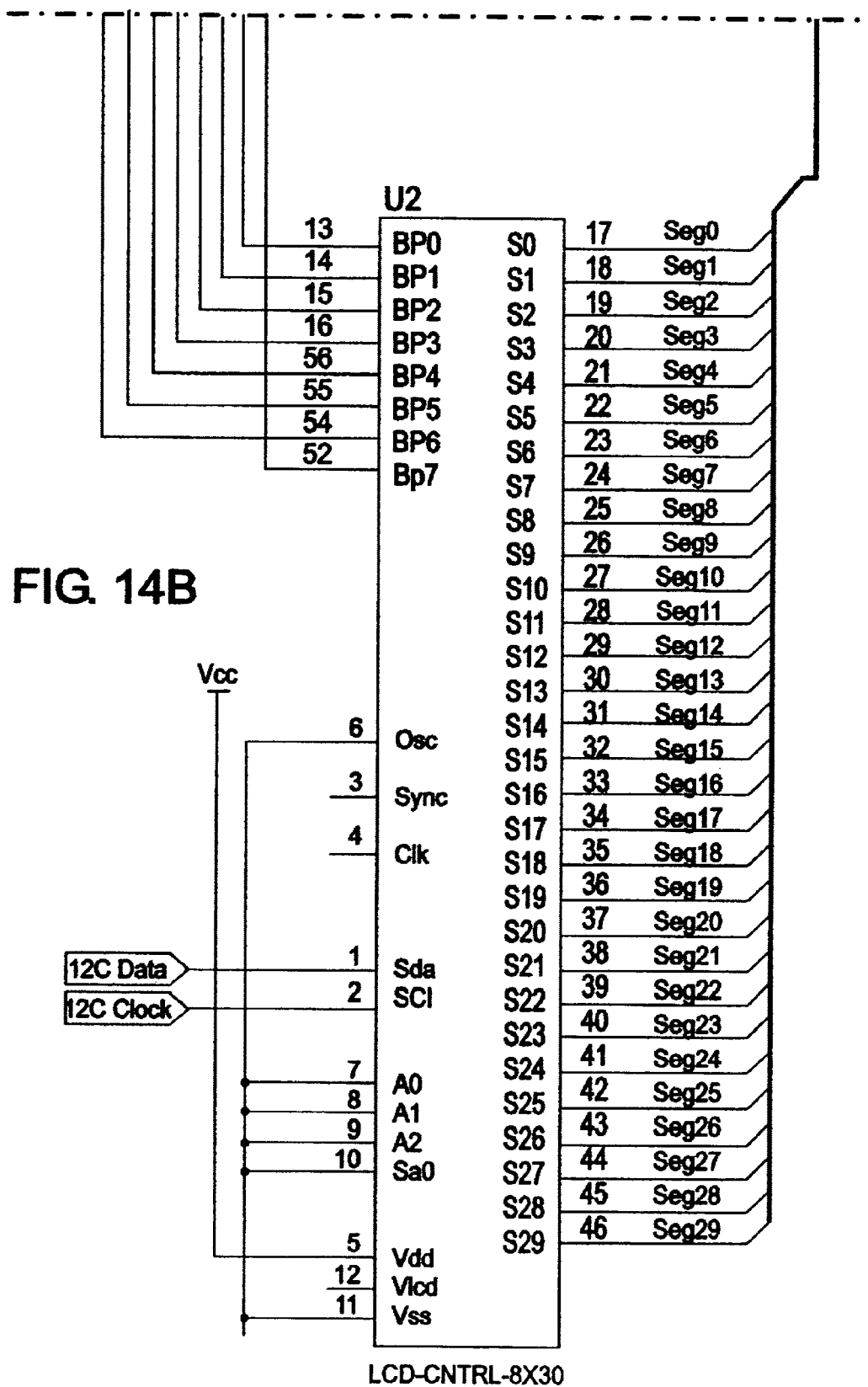
Figure 15:
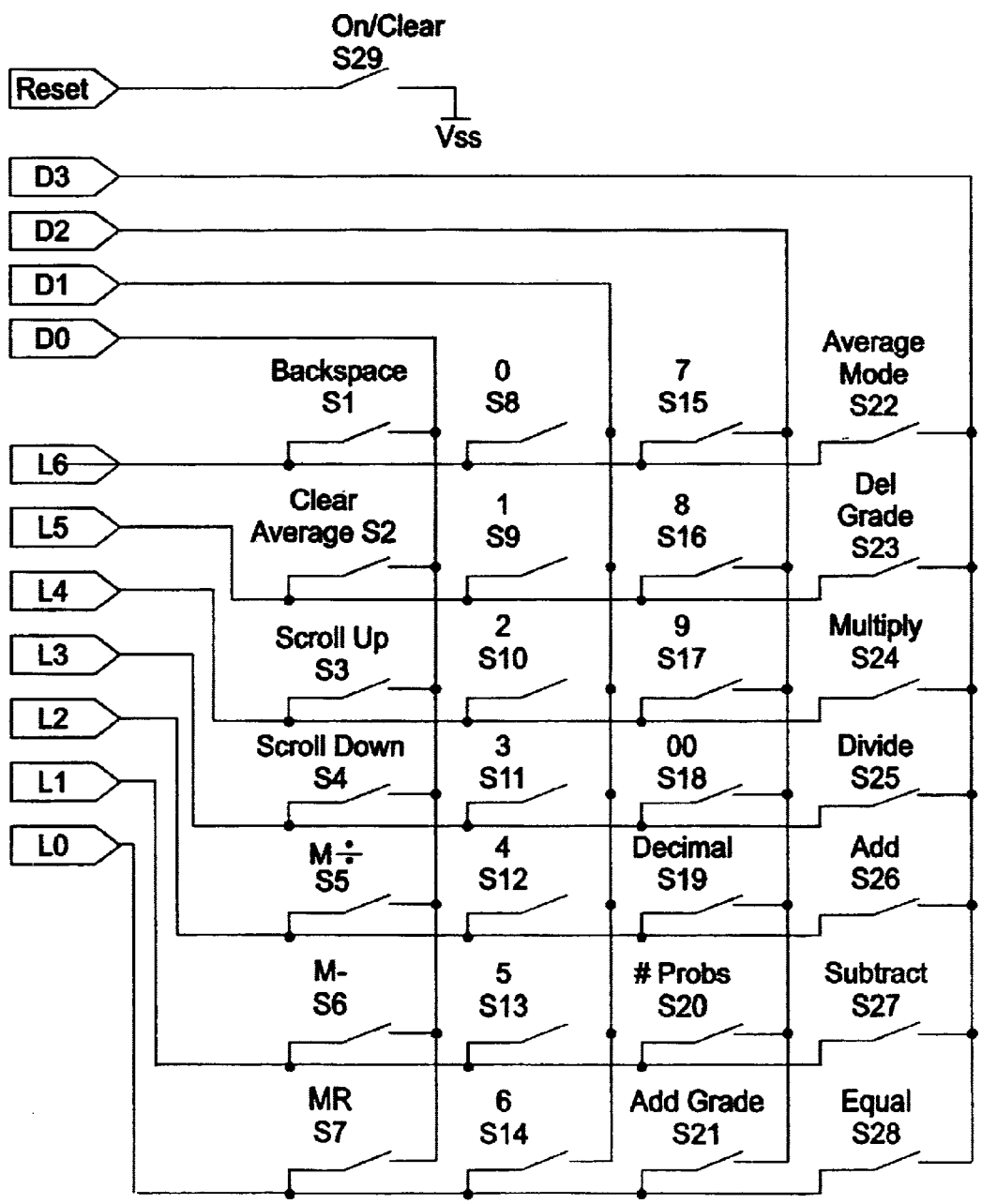
FIG. 15 is an exemplar electric schematic view of one of a number of examples of the utilization in the present invention of keypad input means in functional communication with a processor element of microprocessor means, utilized within the scope of the calculator of the present invention.
Figure 16:
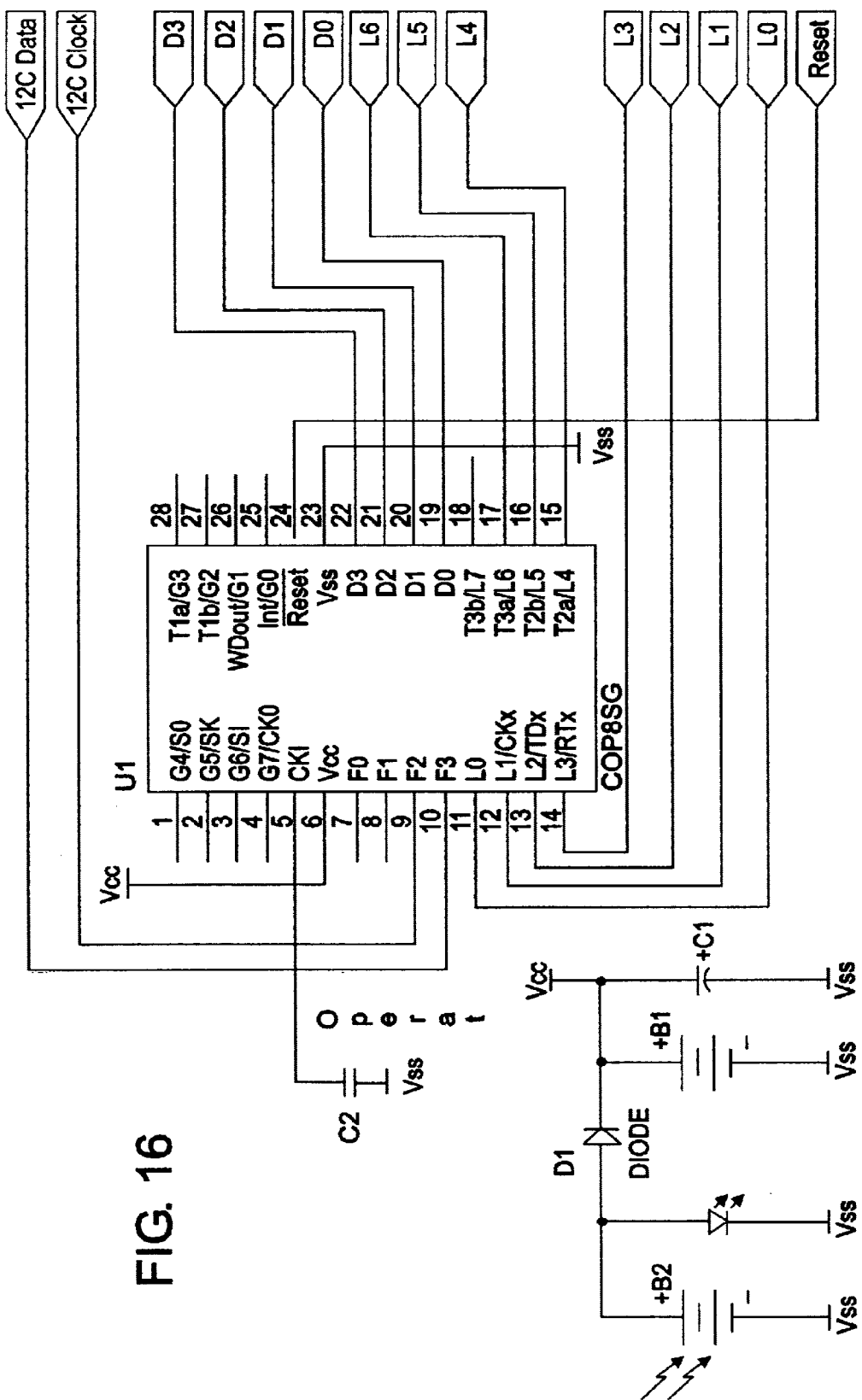
FIG. 16 is an exemplar electric schematic view one example, of many utilizable) of processor means or element and a power source.

Basic electrical schematic information is illustrated, generally by example, at FIGS. 14, 15, and 16; respectively; with regard to the LCD (Liquid Crystal Display) means and elements, the keyboard-to-processor format; means and elements, and the processor and power means and elements; described by example with regard to display (33), keyboard assembly (34) and processor (42), respectively.

As indicated herein, the processor (42) is preferably one micro processor which functionally encompasses the structure and functional capabilities, as illustrated in FIG. 12; namely, Arithmetic Logic Unit (46), Display Driver (44), Memory (47) (or Memory Storage Means) and Clock/Timer (45).

It is also within the scope and spirit of the present invention that the above functions can be addressed and implemented by two or more processor or microprocessor (42) means and elements.

A number of items can be utilized with respect to the Display Driver (44) (or LCD Controller), the processor or micro-processor (42) and the visual display (33) (or LCD layout).

The "COP8SGR728M9" (COP8SGR528M9 for mask version) uC from National Semiconductor™ and the bu9728akv lcd controller from Rohm™ are usable options in this regard, along with an LCD layout using two 34 pin, 1.27 mm pitch cables.

Also, other options for use are the OTP M37529EFFP, if available from the manufacturer, the emulation MCU and programing adaptor: M37520RFS and PCA7429G02; and, with respect to mask, the M37529MF-XXXFP (LCD MCU application); each, from Mitsubishi Electronics Americas (Inc.).

Another processor or microprocessor chip, means or element, utilizable with regard to the present invention would include the "SPLB24A" (only this IC, no other Drivers needed), manufactured or distributed by Sunplus Technology Co., Ltd. (Taiwan), with ICE (In-Circuit Emulator) and SPMC24A Emulation Board. Also, in this regard adaptive use of LCD by 68 pins connection.

Additional "COP8SG" Family microprocesors (microcontrollers) are utilizable, custom adaptable or custom manufacturable for use in a format where one or more such units (one time programmable versions) are utilized.

Within a computer, in the art, the CPU, or central processing unit, can be contained on a number of single integrated circuits called a microprocessor; which, in a computer, is located on the motherboard. An integrated circuit, also called a "chip" or an "IC", is a complete electronic circuit that has been etched on a thin slice of material such as silicon, or like material. The central processing unit (CPU) contains the control unit and the arithmetic/logic unit. These two components work together using the program and data stored in memory to perform the processing operations. The control unit can be visualized as the 'brain' of the computer; and, in this case, of the calculator of the invention. In this regard, as the 'brain' controls the 'body', the control unit controls the calculator. Most control units operate by repeating the following four operations, called the 'machine cycle': fetching, decoding, executing, and storing. Fetching involves obtaining the next program instruction from the memory. Decoding involves translating the respective program instructions into the commands that the calculator can process. Executing involves the actual processing of the calculator commands. Storing manifests itself when the result of the instruction is written to memory. Fetching and decoding are referred to as the instruction cycle. Executing and storing are refered to as the execution cycle.

The CPU's arithmetic/logic unit (ALU) contains the electronic circuitry required to perform arithmetic and logical operations on data. Arithmetic operations include addition, subtraction, multiplication, and division. Logical operations comprise comparing one data item to another to determine if the first date item is greater than, equal to, or less than the other. Based on the result of this comparison, different processing may occur.

Both the control unit and the arithmetic/logic unit contain registers, which are temporary storage locations for specific types of data. separate registers exist for the prevailing or current program instruction, the address of the next instruction, and the values of the data being processed in the operation.

RAM (random access memory) refers to the integrated circuits or chips, normally in the art, which can be read and written by a microprocessor or other computer device. RAM memory is said to be volatile in that the programs and data stored in RAM are erased when the power to a computer, for example, is turned off. As long as the power is supplied, the programs and data stored in RAM will remain as is until they are replaced by other programs, data, or instructions. ROM (read only memory) refers to chips that store information or instructions that do not change. In the present invention, the instructions of the programming subroutines, etc. described as part of the present invention, is stored, permanently in this type of memory. With ROM, specific instructions and data are recorded permanently in the memory when it is manufactured. ROM memory is referred to as being nonvolatile in that it retains its contents even when the power is turned off. The data or programs stored in ROM can be 'read' and 'used', but cannot be altered; therefore, the name 'read only'. This concept is important to the structure and use of the calculator of the present invention.

The unique expanded display (33) of the present invention and calculator (10) provides the novel advantage of showing a group, plurality, or multiple potential numeric grades simultaneously. In the illustrated embodiments the display is shown providing a list of 10 (ten) potential numeric grades in horizontal fashion simultaneously, with the highest grade in the sequence appearing to the left of the first number display field (1) portion of the expanded display (33) and the lowest grade in the sequence appearing to the right of display field (1).

It will be understood, within the scope and spirit of the invention, that the expanded display (33) (or the LCD means) can al so be set up structurally to functionally provide another chosen preselected list of 2 or more potential numeric grades, or a multiple of potential numeric grades exceeding 10 such grades. Preferably, however, ten such grades have worked very well in preferred embodiments of the invention, and would prove to be an advantageous number for teachers, mathematicians or other workers to utilize.

Figure 1A:
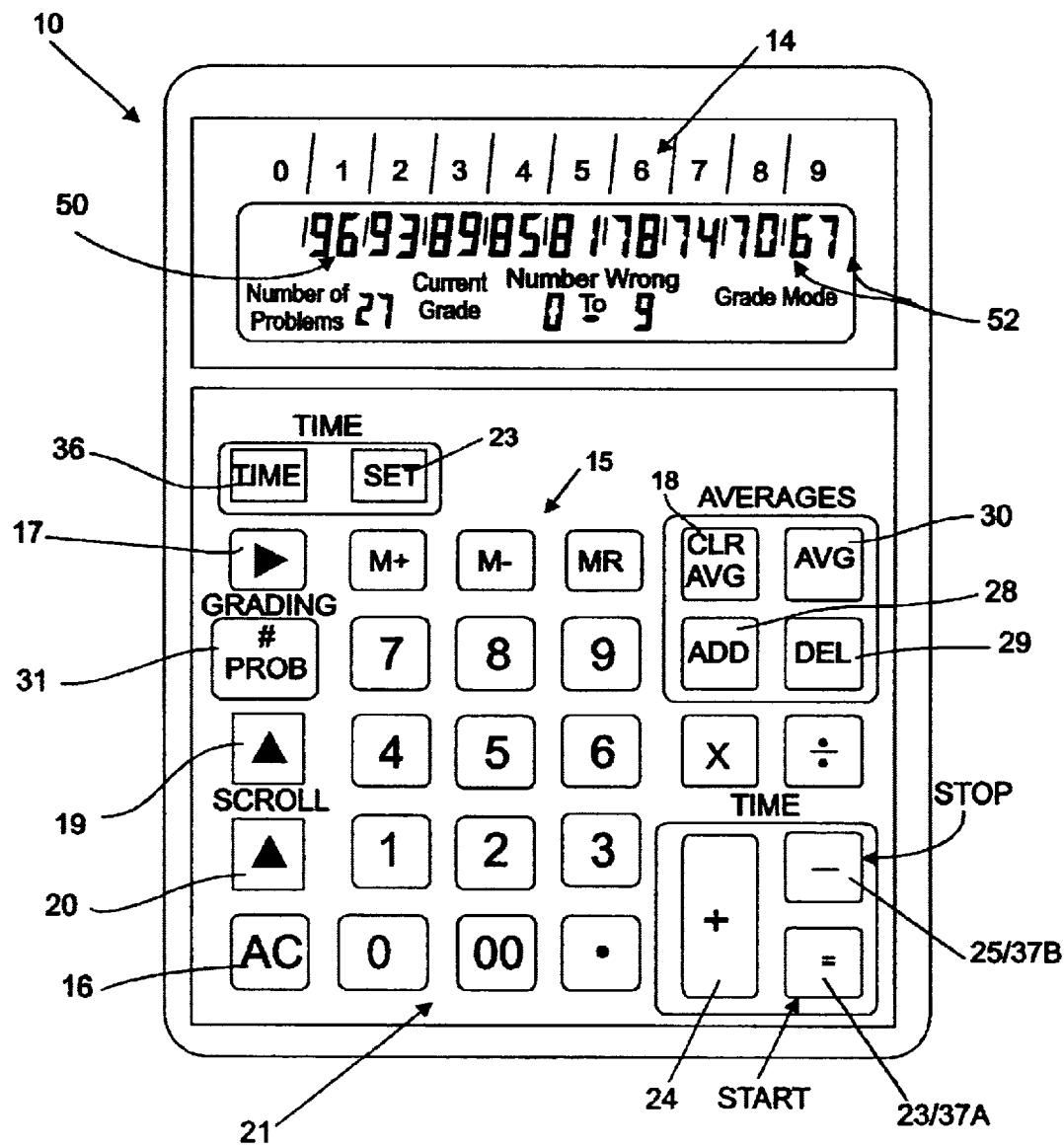
FIG. 1A is a top plan view of another preferred embodiment of the present invention.

More particularly, the number of problems on a test or an exam, for example, is entered and the numeric range of problems (Number of Problems text segments 2 and 4) displayed at (5); for example "27" (as illustrated in FIG. 1A); determines the grade list to be displayed at the number display field (1) of the expanded display (33) (or LCD). As illustrated, the 'Number of Problems' is displayed on the LCD display (33), proximal, adjacent; or as shown, below; the grade list displayed at number display field (1); at the number display field, for description purposes designated as the second number display field (5) of the LCD expanded display (33). However, it will be understood within the scope and spirit of the present invention, that the second number display field (5), where the 'Number of Problems' (on an exam, etc.) is listed could also be placed in another positional location in reference to the first number display field (1) than that illustrated by example in FIG. 1A; and that each of the number display fields (1), (5), (7) and (9) (the first, second, third and fourth number display fields, respectively) could be positioned in different locational or logistic relationship or proximity to one another, than those set out and illustrated by example herein.

Using specific keys on the keyboard assembly (34) of the calculator (10), a grade can be determined by scrolling through the grade list and finding the actual grade corresponding to the actual number of problems missed by a student or test-taker. Index number segments (14), illustrated as helpful indicators above the grade list displayed at number display field (1) (but which can be in other positional locations in relation to the grade list); are utilized, within a range of problems wrong (displayed at 7 and 9); to find the actual specific grade of a test-taker or examinee. In one embodiment, ten potential numeric grades are displayed horizontally with the highest grade on the left, as indicated, and further illustrated herein. The multiple or 10 potential grades, illustrated by example as being horizontal in positional configuration, can also, within the scope of the invention be positionally oriented in vertical, diagonal, linear, arcuate or other positional configuration as each grade on the list relates to the other, and with the identifying or indicating index number segments (14) being proximal or adjacent to each respective grade displayed on the grade list.

As indicated, described and illustrated herein, another advantage of the calculator (10), and the teachings of the present invention, is the ability, structurally and functionally, to provide a novel or unique method of adding, editing and deleting grades from a stored list of grades while concurrently displaying their prevailing (or resulting) Average; as this relates to the novel manner of presenting and displaying the information utilized in the averaging process of the calculator (10).

More particularly, utilizing special keys of the keypad assembly (34) of the calculator, numeric grades are placed into an indexed list of grades to be averaged. The list of grades is stored in the calculator's memory until it is cleared or edited. Previously entered grades, for averaging purposes, can be reviewed, edited or deleted while scrolling forward or backwards (up or down the average grade list) through the list of grades using the special keys provided for this purpose. The prevailing or resulting Average is calculated and displayed on the first number display field (1), in proximal or proximate positional location in relation to the 'Current Grade' (6) indicator and at the third number display field (7) of the LCD expanded display (33); and in response to a current grade being entered, edited or deleted. The helpful indicator marked and identified as 'Number of Grades; i.e., the specific index number of the grade being reviewed and considered, is displayed at the second number display field (5) of the LCD expanded display (33).

As indicated with regard to the discussion of the Grade or Percentage List Mode of the calculator (10), the positional llocation of the number display fields (5), (7) and (1); utilized in the Average Mode of the invention; can be placed in different relevant positional location in relation to one another. Within such preferred embodiments related thereto, and illustrated by example herein; the positional relationship is one where the 'Number of Grades' indicator and second number display field (5) (where the index number of the number being considered for Averaging is displayed) is placed positionally to the left side and below the first number display field (1); and the 'Current Grade' indicator (6) and the third number display field (7), where the current number being analyzed for averaging purposes is displayed; is positionally along a middle portion of and below the first number display field (1).

The present invention and calculator (10) is a specialized electronic calculator, for calculating percentages and averages; which when presented a maximum integer value, calculates percentages for all integer numbers below that value, and displays multiple percentage values, concurrently, on a unique expanded display (33); with the intent of facilitating the displayed viewing of a wide range of possible percentage values simultaneously; and which when presented a sequence of numbers calculates their average.

The calculator (10) has specific key pads (a part of its assembly 34), input means and algorithms for calculating and displaying, simultaneously on a novel visual, expanded display (33), multiple calculated percentages, based on a maximum integer number entered by the operator, and whose calculated values correspond to integer increments below this (said) number.

The calculator (10) is capable of simultaneously displaying multiple calculated percentages, and enabling display of all calculated percentages by means provided for scrolling through multiple ranges corresponding to all possible integers below a maximum value or starting value.

The calculator (10) has specific input keys (or key means) and algorithms to facilitate the calculation and display of the average value for a stored sequence of operator-entered values, permitting the ready display of these (said) values, and the rapid appending or deletion of values to this (said) sequence.

The calculator (10) is also capable, structurally and functionally, of displaying the time of day, acting as a time of day 'alarm' and functioning as a 'count down' 'timer' and 'alarm'.

Additionally, the calculator (10) is capable of operating in a Calculating Mode (or standard calculation mode) utilizing, as a minimum, the arithmetic functions of addition (+), subtraction (−), multiplication (×), division (÷), and 'equals' (=) or equality functions.

In preferred embodiments of the invention, described by example, within the scope and spirit of the invention (having other examples), the calculator (10) comprises a custom keypad (34) having a plurality of numeric, arithmetic and special function keys functionally connected to a microprocessor (42); a microprocessor (42) for processing and generation of digital information; a clock/timer (45) means or element, which can be contained within the microprocessor (42) or be external thereto, but functionally connected to the microprocessor (42) for the purpose of continuously monitoring time; an alarm means or element for alerting the operator or user to certain conditions; a memory element (or memory storage means or element) (47) which can be contained within the microprocessor (42) or be external in relation thereto; but which is functionally connected to the microprocessor (42) for storage of software programs and/or storage of operator entered and/or calculated values; a display driver or controller (44) which can be contained within the microprocessor or be external in relation thereto; but which is functionally connected to the microprocessor (42) and a visual display means (33) (or LCD means), for the purpose of interpreting digital information form the microprocessor (42) for the visual display means (33); a custom visual display means (33) which is structurally and functionally capable of simultaneously displaying a multiplicity of numbers and indicators in various and multiple number display fields (such as 1, 5, 7 and 9) and text message segment areas (such as 2, 3, 4, 6, 8, 10A, 11, 12 and 13); or, generically speaking can display such elements in various or multiple display field on the display (33), in a functionally advantageous positional relation to one another; and a power source or means, to supply electricity or other power source to the elements of the calculator (10) needing this activation.

FIGS. 1, 1A, 1B and 1C illustrate, by example, preferred embodiments of the keypad assembly (34). Also illustrated therein, by various sized examples, is the expanded display (33) in a preferred embodiment of the invention, enabling the novel presentation and display of up to 10 consecutive grades on a respective grade list, in the grade list mode, while also contemporaneously or simultaneously displaying and indicating the number of problems and the range of number of problems wrong (Number Wrong), as illustrated in FIG. 1A.

Figure 1B:
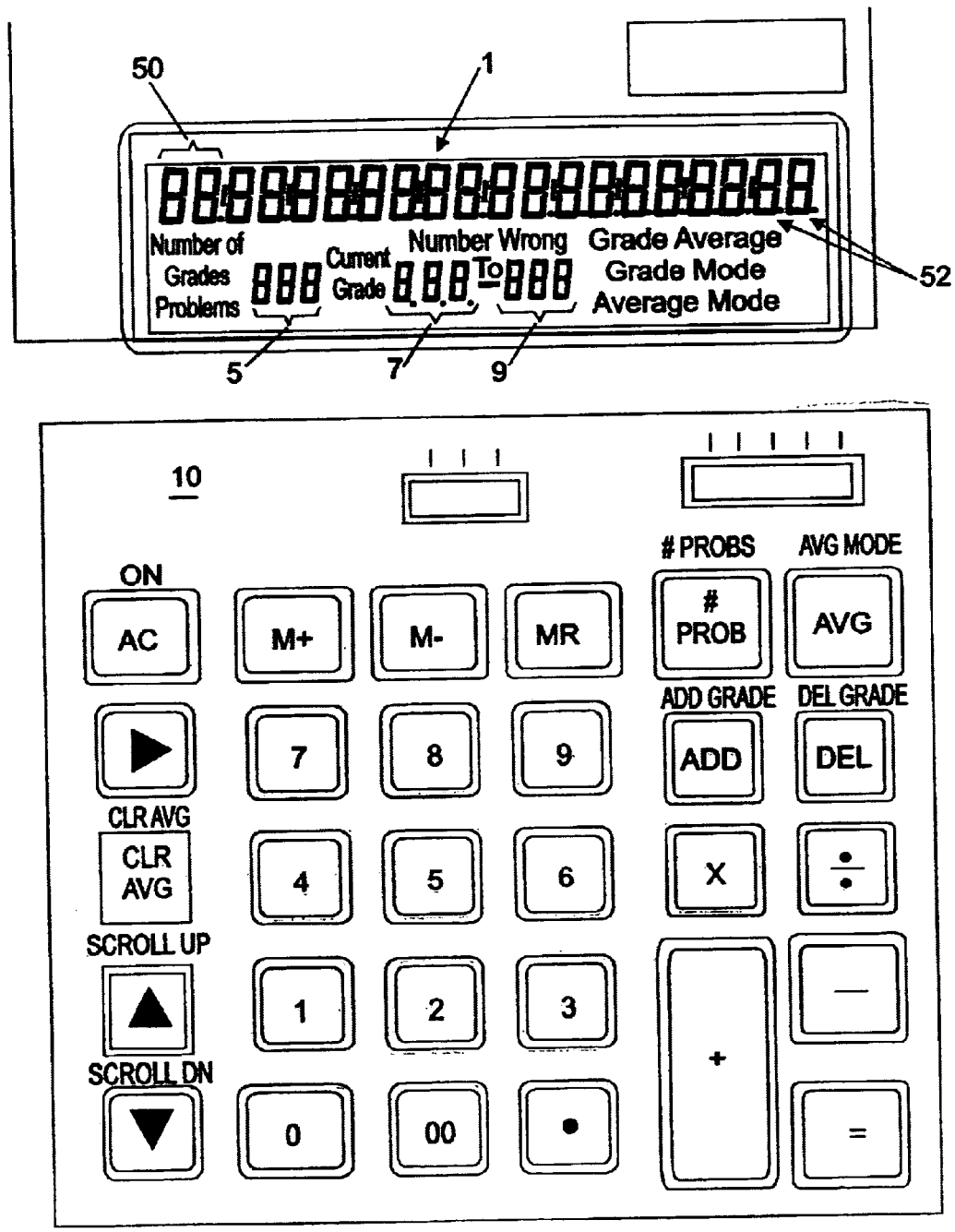
FIG. 1B is a top plan view of another preferred embodiment of the present invention.
Figure 1C:
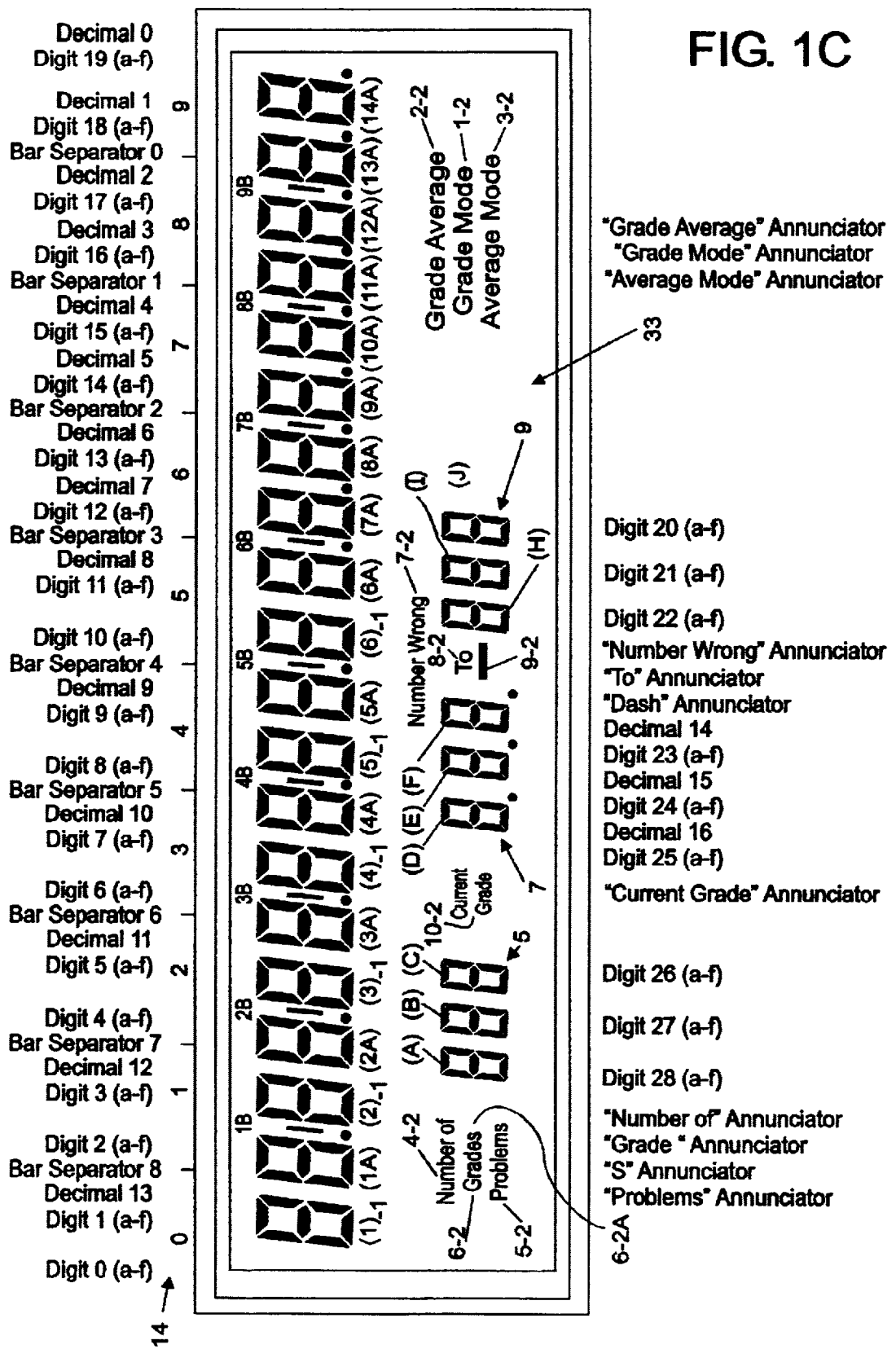
FIG. 1C is an enlarged top plan view of a preferred embodiment of the Expanded Display of the present invention, illustrating the segmented digital/integer/number display elements of the invention.

In FIG. 1C the enlarged expanded display (33) is broken down and illustrated in a manner embraced by the concept and spirit of the invention. The numbering sequence is somewhat different, in that the text message segments (indicia segments) 2, 3, 4, 6, 8, 10A, 11, 12, and 13; are presented in the form and sequence, respectively, of the "Number of" Annunciator (4-2), "Grade" Annunciator (6-2) and "s" Annunciator (6-2A), "Problems" Annunciator (5-2), "Current Grade" Annunciator (10-2), "To" Annunciator (8-2) and the "Dash" Annunciator (9-2), "Number Wrong" Annunciator (7-2), "Average Mode" Annunciator (3-2), "Grade Mode" Annunciator (1-2), and the "Grade Average" Annunciator (2-2). Each of the plurality of activatable and displayable Annunciators (text messages) is positioned, as illustrated by example, in adjacent positional location in relation to each of the number display fields, for identifying a respective numeric value being displayed in, for example, the first, second, third or fourth number display fields.

As illustrated by example, the index number segments are shown in FIG. 1C, (at 14), as consecutive numbers "0" through "9", which, respectively index and define register-portions of the first number display field (1). This is also shown, by example, in FIGS. 1 and 1A.

As shown in FIG. 1C, and by other examples in FIGS. 1 and 1B, the first number display field (1) is provided with a number of LCD (Liquid Crystal Display) segmented digital display subelements (1-1), (2-1), (3-1), (4-1), (5-1), and (6-1). It is also provided with a number of LCD segmented digital/decimal display subelements, (1A), (2A), (3A), (4A), (5A), (6A), (7A), (8A), (9A), (10A), (11A), (12A), (13A), and (14A). And further provided with a number of LCD bar (or Bar Separator) subelements, (1B), (2B), (3B), (4B), (5B), (6B), (7B), (8B), and (9B).

The second number display field (5) is provided with a number of LCD segmented digital display subelements, shown be example in the drawings as three such subelements (A), (B), and The third number display field (7) comprises a number of LCD segmented digital/decimal display subelements (D), (E), and (F); and the fourth number display field (9) is provided with a number of LCD segmented digital display subelements (H), (I), and (J).

It will be understood by those skilled in the art that a Liquid Crystal Display (LCD) is, in essence, a sandwich of liquid crystals which lies at the heart of the liquid crystal display in, for example, a calculator or watch. Light striking the display is first polarized and then passes through transparent electrodes and liquid crystals to a second polarizer at right angles to the first. At the rear of the display is a mirror. The liquid crystals affect the polarized light so that it is either blocked or reflected by the segments of the display, which go dark or light. A number, for example, is produced by a group of segments linked to a battery, solar cell or other power source. Each segment is normally light and cannot be seen. When an electric signal (or energy signal) passes to it, the segments darken in patterns that form numbers or other desired identifying symbols as preselected and constructed. In the present case, the present invention presents a novel and unique expanded display (33) which can organize and present information and numeric values in an improved and work-accessible manner, more desirous to a teacher, educator or analyst, in Education and in other fields such as science.

In the present invention the respective LCD segmented digital display subelements identified above with regard to the first (1), second (5) and fourth (9) number display fields; are, each, segmented so that segments can be activated and displayed as an integer from "0" to "9", in preferred embodiments of the invention.

Each respective LCD segmented digital/decimal display subelement of the first (1) and third (7) number display fields is segmented so that segments can be activated and displayed as an integer from "0" to "9" and as a decimal point to the right of, or otherwise appropriately adjacent to, the integer.

Each LCD bar display subelement of the number described with regard to the first number display field (1), is contemporaneously or simultaneously activateable and displayable, and is made up of a generally or substantially vertical line segment or bar separator segment, in preferred embodiments, which is positioned generally parallel between selected pairs of the LCD segmented digital/decimal display subelements and the LCD segmented digital display subelements, as illustrated, by example, in FIGS. 1, 1A, 1B, and 1C.

As illustrated, by example, in FIG. 1A, the first number display field (1) comprises or is made up, in preferred embodiments of the invention, of 10 numeric subdisplay fields, as indicated under each of the index number segments (14), with which they register and generally align.

The subdisplay fields 50 are also illustrated by example in FIGS. 1, 1B and 1C. Also illustrated therein are the two digital space areas 52, which in preferred embodiments of the calculator (10) comprise and make-up each of the ten numeric subdisplay fields 50.

In FIGS. 1 and 1A, examples are illustrated of individual key pads or key members within and a part of the keypad assembly 34 of the calculator 10. These key pad members are as follows:

| Key | Designator |
| --- | --- |
| AC/ON | 16 |
| Backspace | 17 |
| CLR AVG | 18 |
| Scroll UP | 19 |
| Scroll DN | 20 |
| # PROB | 31 |
| AVG | 30 |
| DEL | 29 |
| ADD | 28 |
| / | 27 |
| × | 26 |
| − | 25 |
| + | 24 |
| = (set Time) | 23 |
| . | 22 |
| Memory Keys | 15 |
| Individual Numbers | 21 |
| Time | 36 |
| Start/Stop | 37 |

One of the preferred embodiments of the present invention, illustrated at FIG. 1A, shows the "=" key (23/37A) and the "−" key (25/37B) as augmenting and carrying out input information data which is illustrated in FIG. 1 (another preferred embodiment of the invention) as the "Start/Stop" key (37). The "START/STOP" key, shown in FIG. 1 as element (37) is not utilized in the preferred embodiment of FIG. 1A; and in similar capacities the "=" key (23/37A) and the "−" key (25/378), as illustrated in FIG. 1A, are respectively utilized to 'START' and 'STOP' timing (or TIME MODE) operations described herein. In the embodiment of FIG. 1A, the "=" key (23/37A) and the key (25/37B) also function in the CALCULATOR MODE in mathematical or arithmetic roles, as does the "=" key (23) and the "−" key (25) shown in FIG. 1; but with the added functions of 'starting' and 'stopping' time operations. Another difference in the preferred embodiments of the invention illustrated and shown in FIG. 1 and FIG. 1A; is that, in the embodiment of FIG. 1, the "=" key (23) is shown as also functioning to "SET TIME" in timing operations, thus, in this embodiment of FIG. 1, not utilizing a 'separate' SET (or SET TIME) key; while in FIG. 1A, the "SET" KEY (23) is shown as a 'separately' functioning key for this purpose. Other positional orientation-differences within the keypad assembly (34), and visual appearance differences in other various elements, will also be noted between these two preferred embodiments of the present invention; each of which is described herein. All of these differences are intended to fall within the scope and spirit of the present invention.

A novel mode utilized as a part of the present invention, is the Grade List Mode, which in preferred embodiments of the invention displays a list of possible grades horizontally, as illustrated, across the expanded display 33 of the calculator 10, at the first number display field 1. The number range of problems missed is displayed on the third number display field 7; and the total number of problems on a given test is displayed on the second number display field 5. The index number segments 14, adjacent to the expanded display 33, provide number indicators for reading the registered or adjacent individual numbers appearing on the display 33. The numbers so appearing on the display 33 are rounded to the nearest two or one digit whole number. In this manner the exact score on a given test can be determined by the exact number of problems wrong, within a range of problems wrong.

Examples of this programming and process of the present invention are as follows:

EXAMPLE 1

Enter the number of problems on the test by using of the individual numbers key pads 21, and then pressing the #Prob key pad 31. The number "41" is keyed or pressed in on the individual number key pads 21, as an example of the number of problems in a given test or exam. The calculator 10 is now in the Grade List Mode and displays the number "41" at the second number display field 5. Also displayed at this time is the GradeList as follows:

| 0 | 1 | 2 | 3 | 4 | 5 | 6 | 7 | 8 | 9 |
| --- | --- | --- | --- | --- | --- | --- | --- | --- | --- |
|  | 98 | 95 | 93 | 90 | 88 | 85 | 83 | 80 | 78 | at the first number display field 1. The number "0" is displayed at the third number display field 7, and the number "9" is displayed at the fourth number display field 9. Also, at this time, the test message segments 2, 4, 8, 10A, and 12, will be on or viewably displayed on the expanded display 33, as indicators of the information being utilized in this mode of the invention. If one assumes for the purpose of this example that 3 (three) problems on the test or exam being utilized for the purpose of this example, were missed on this exam or were considered 'wrong', this number of missed problems is found to be within the range of problems missed of Number Wrong, text message segment 10A; and as shown on the third number display field 7, the text message segment 8, and the fourth number display field 9:

Number Wrong

0 To 9

To determine the grade, in this example, one utilizes the index number segments 14, adjacent to the display 33, to find the individual number "3", therewithin. One then looks below or adjacent to this number "3" of the segments 14 to find the grade for 3 (three) problems missed of "93", as shown above.

EXAMPLE 2

One enters the number of problems on the student's test by using the individual numbers key pads 21, and then pressing the #Prob key pad 31. The number "41" will be used for this example. The calculator 10 is now in the Grade List Mode and displays the number "41" at the second number display field 5. The calculator 10 also displays the GradeList:

| 0 | 1 | 2 | 3 | 4 | 5 | 6 | 7 | 8 | 9 |
|---|---|---|---|---|---|---|---|---|---|
|   | 98 | 95 | 93 | 90 | 88 | 85 | 83 | 80 | 78 | at the first number display field 1; displays "0" at the third number display field 7; and displays "9" at the fourth number display field 9. The test message segments 2, 4, 8, 10A, and 12, will be on and display as indicators at this time. If, for the purpose of this example, one assumes that "12" problems on the student's test were missed; one notes that the number of problems missed is out of the range of problems missed, on and displaying at the Number Wrong, text message segment 10A, as indicated at the third number display field 7, the text message segment 8 and the fourth number display field 9:

Number Wrong $0 \overset{\text{To}}{\phantom{-}} 9$

In this case, one utilizes the Scroll Up key pad (19), to go to the next range of problems missed. In this regard, it is noted that the range of Number Wrong, text message segment 10A, as indicated by the third number display field (7), the text message segment (8) and the fourth number display field (9), increments by 10 (ten) problems each time, or until the number of problems wrong on the given test/exam is reached within successive ranges of ten (10). After pressing the Scroll Up key (19), the first number display field now displays:

| 0 | 1 | 2 | 3 | 4 | 5 | 6 | 7 | 8 | 9 |
|---|---|---|---|---|---|---|---|---|---|
|   | 76 | 73 | 71 | 68 | 66 | 63 | 61 | 59 | 56 | 54 |

The Number Wrong, text message segment 10A, is indicated and displayed as "10" at the third number display field (7) and "19" at the fourth number display field (9). One now notes that the number of problems actually missed on the student's exam/text, for the purposes of this example, is now within the Number Wrong 10A (test message segment) as indicated at (7), (8), (9), and (10A). To determine the grade of the student, having missed in this case "12" problems on the test, one uses the tens position of the number of problems missed which is the number "2" on the index number segments (14), adjacent to the display (33). Having found the number "2" at (14), one looks below or adjacent to this number to find the grade for "12" problems missed, which is "71", as shown above.

It will be understood within the spirit and scope of the present invention, that, although the number of missed problems or questions on a student's exam was used as an example of the type of calculations that can be performed and displayed utilizing the present invention; that a number of other such types of percentage calculations can also be performed.

For example, the number of pieces of pie, cut into equal sized pieces, could be utilized in determining what percentage of the pie was still left after taking a certain number of pieces from the pie. Additionally, many such other examples of these types of problems could be the subject of solving the percentage left of existing after some number of equal parts was taken, or considered to be missing or no longer a part of the whole from which one started, thereby rendering the percentage of the whole which was left after these parts were taken. The examples thus set forth indicate a percentage mode of the invention which finds one preferred use as a Grade List Mode, which teachers, instructors and professors can easily utilize for calculating test scores when each of the questions utilized has the same value, in a given test or exam.

The percentage or GradeList Mode of the calculator 10 is provided with certain subroutines in preferred embodiments of the invention.

The GradeList Mode can only be entered using the #Prob key pad 31. During normal calculator 10 operation, if the #Prob key pad 31 is pressed as indicated at 301, in FIG. 3, the number is checked to be Greater than "0" or less than "1000", as indicated at step 302 in FIG. 3. If it is not within these limits or range (>0<1000), the calculator 10 will display "ERR" at step 303. If the number entered is valid, and within the range set forth, the DisplayGradeListSubroutine step 305 is performed, as shown as the end portion of FIG. 3, and in FIG. 2.

Figure 2:
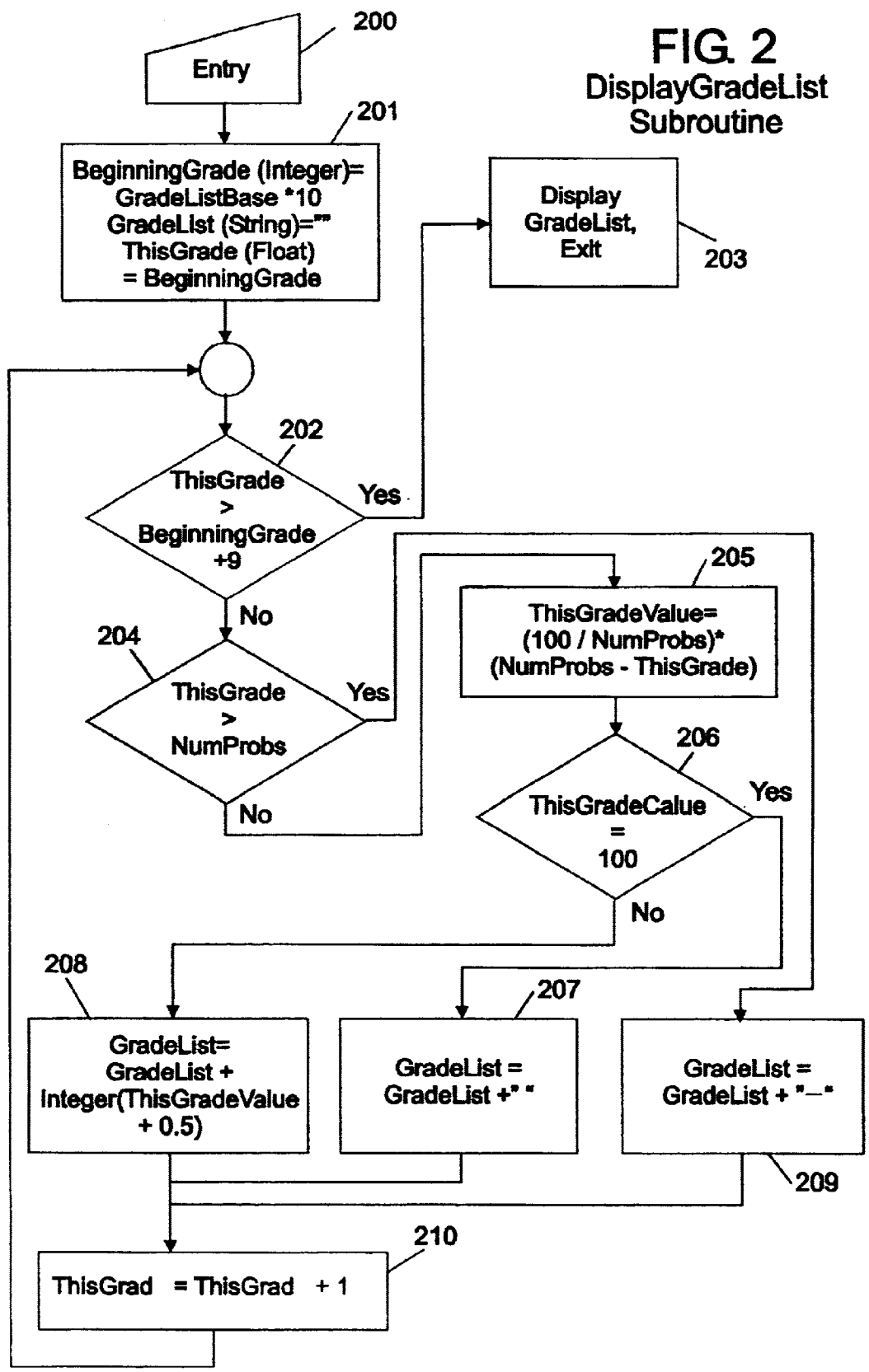
FIG. 2 is an exemplar flow chart illustrating the Display Grade List Subroutine of the programmed Grading Mode of the present calculator and invention.

The DisplayGradeListSubroutine is shown, then, more fully, as illustrated in FIG. 2. The number of problems or questions on a test, for example, have been entered and properly found to be within the range discussed with regard to FIG. 3. This completed entry step is now shown as step 200 for purposes of illustration in FIG. 2. In step 201, the "BeginningGrade" variable is set equal to the "GradeListBase" variable times (× or multiplied by) the number "10".

The "GradeListBase" variable is set to the value "0" unless the "SCROLL UP" key pad 19 or the "SCROLL DN" key pad 20 are used (pressed); in which case it will then be incremented or decremented by one.

The "GradeList" variable used to hold the text gradelist to be displayed on the display field 1, on the expanded display 33, is cleared. The "ThisGrade" variable of step 201 of the program and process of the present invention, will be set equal to the "BeginningGrade" variable. The following sequence describes how the text base "GradeList" variable is created. If the "ThisGrade" variable of step 202 (FIG. 2) becomes greater than the "BeginningGrade" plus 9, the "GradeList" string 203 is displayed on the first number display field 1, the number wrong, utilizing 7, 8, 9, and 10A, is displayed, and the number of problems is displayed, utilizing 2, 4, and 5. Otherwise, step 204 is engaged or utilized if the "ThisGrade" variable is greater than the "NumProbs" variable. The "GradeList" variable of 209 is appended with "—" to denote no valid grade in this position. Then, step 210, the "ThisGrade" variable is incremented and then the process starts again at step 202 until the "ThisGrade" variable is greater than the "BeginningGrade" variable plus 9. If, at step 204, the "ThisGrade" variable is less than the "NumProbs" variable, the "ThisGradeValue" is created at step 205 by dividing 100 by the "NumProbs" variable and multiplying it by the result of the "NumProbs" variable minus (−) the "ThisGrade" variable. Once the "ThisGradeValue" is created it is checked to be equal to 100 at step 206. If it is equal to 100 the "GradeList" variable is appended with " " (two spaces). If the "ThisGradeList" variable is less than 100, then the result of the integer portion of the "ThisGradeList" variable added with 0.5 is taken and added to the "GradeList" string variable. Then, at step 210 the "ThisGrade" variable is incremented and the process starts again until step 202 is 'Yes' and the "GradeList" variable is displayed at (1), the number wrong at (7), (8), (9), and (10A), and the number of problems is displayed at (2), (4), and (5); of the display (33) of the calculator (10).

Using the "SCROLL UP" key pad (19) and the "SCROLL DN" ("SCROLL DOWN") key pad (20), the range of the list of grades is displayed at (33), and can be changed to reflect a range in which a grade corresponding to the number of problems missed can be found.

Figure 4:
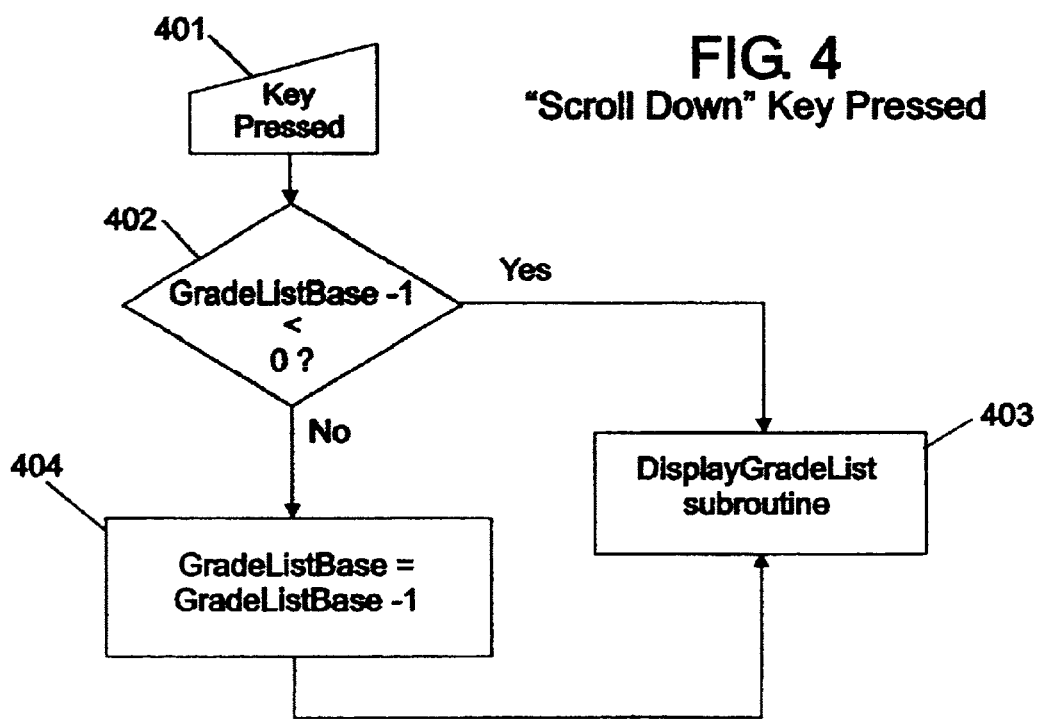
FIG. 4 is an exemplar flow chart illustrating the "Scroll Down" Key Pressed Subroutine as it relates to the Display Grade List Subroutine, within preferred embodiments of the Grading mode programmed into the microprocessor chip and processor means of the calculator of the present invention.

With regard to the Scroll Down Key Pressed Subroutine, illustrated in block form at FIG. 4; it is noted that if the "SCROLL DOWN" key (20) is pressed as a part of step 401, then the "GradeListBase" variable minus 1 is compared to 0 at step 402. If the result is 'YES', then step 403 indicates to run the "DisplayGradeList" subroutine 200, as illustrated and discussed with regard to FIG. 2. If the result is 'NO', then step 404, to subtract '1' from the "GradeListBase" variable, then step 403, to run the "DisplayGradeList" Subroutine starting at 200, as set out in FIG. 2.

Figure 5:
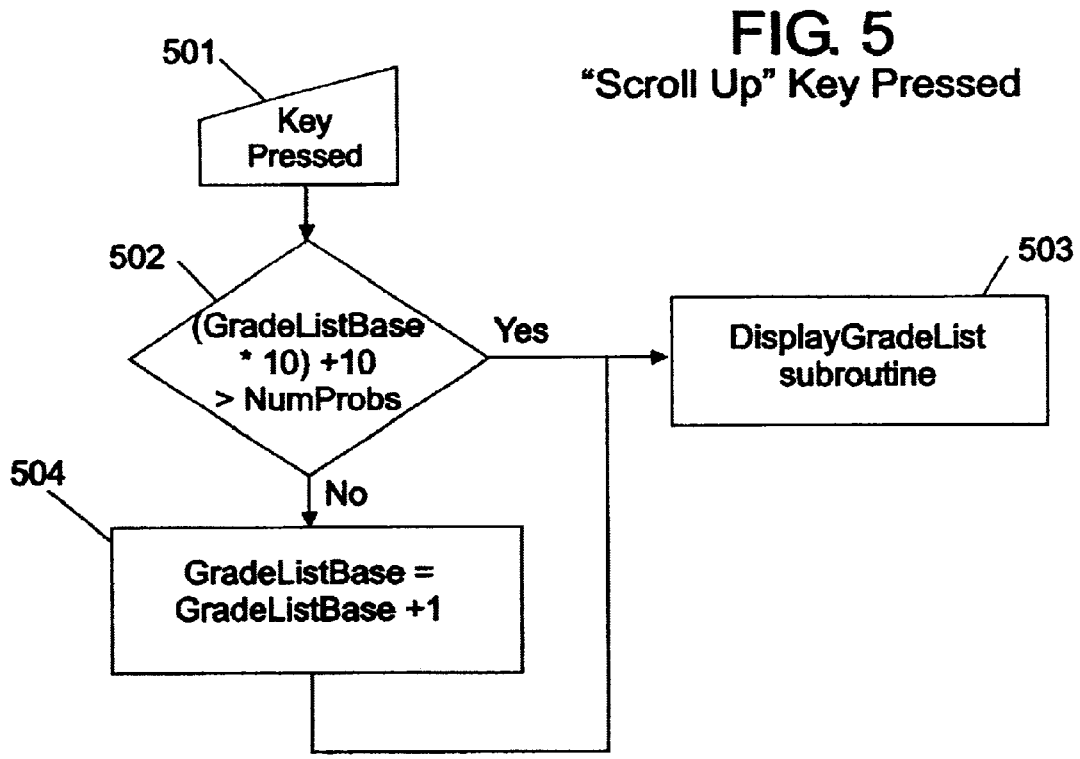
FIG. 5 is an exemplar flow chart illustrating the "Scroll Up" Key Pressed Subroutine as it relates to the Display Grade List Subroutine, within preferred embodiments of the Grading Mode programmed into a microprocessing chip means of the calculator of the present invention.

With regard to the Scroll Up Key Pressed Subroutine, illustrated in FIG. 5; the "SCROLL UP" key (19) is pressed, as symbolized at step 501. The "GradeListBase" variable times 10 plus (+) 10 is compared to the "NumProbs" variable (number of problems on the test/exam) at 502. If the result is 'YES', then step 503, to run the "DisplayGradeList" Subroutine (200, of FIG. 2). If the result is 'NO', then step 504, add '1' from the "GradeListBase" variable; then step 503, to run the "DisplayGradeList" Subroutine (step 200, FIG. 2).

With regard to the Grade List (Percentage) Mode of the present invention, and programming, software and method or procedure utilized as a part of the Calculator 10; the 'Variable Names', description and relationship to the information displayed at 33, includes, in preferred embodiments of the invention, the following:

Variable Names

NumProb: The maximum number of problems on an exam or test, displayed on the second number display field 5.

GradeListBase: Determines which range of problems missed will be calculated and displayed,
GradeListBase=2 displays 20 (7) to 29 (9) problems missed.
GradeListBase=3 displays 30 (7) to 39 (9) problems missed, etc.

BeginningGrade: The lowest number of problems missed that will be displayed (7).

ThisGrade: The ThisGrade value is equivalent to the number of problems missed. The value is initially set to the lowest number of problems missed and is incremented by "1" each time the subroutine is repeated. The final ThisGrade value is displayed as the upper range of the problems missed displayed at (9).

ThisGradeValue: These are the raw percentage scores for the given number of problems missed. They are rounded upward to the nearest integer value and are appended to each other to create the GradeList.

GradeList: This is the displayed list of 10 numeric grades corresponding to the number of problems missed. Each numeric score occupies 2 digit positions on the display (1) except for the score of 100% which is represented as 2 blank spaces and invalid (out of range) scores which are represented as "—".

Figure 3:
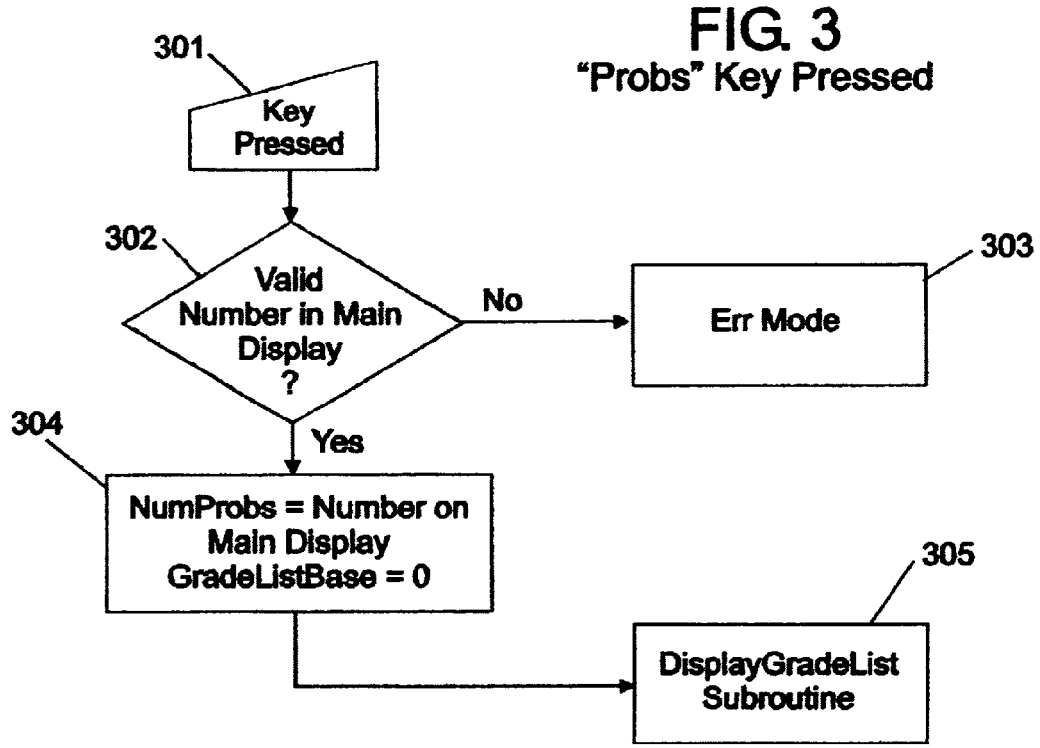
FIG. 3 is an exemplar flow chart illustrating the "# Probs" Key Pressed Subroutine of the programmed Grading Mode of the calculator of the present invention.

With respect to entering the Grade List (Percentage) Mode, as illustrated in FIG. 3; this routine describes the software and operator actions required to enter the Grade List mode. The routine checks the errors and identifies and sets the initial variable values:

| Module # | Action |
|---|---|
| 301 | 1. To enter the Grade List mode, the number of problems on an exam is entered using the numeric keys (21) and the #PROB key (31) is pressed. 2. The program then verifies the number entered is within the acceptable range (302). |
| 302 | If the base number is not between 0 and 1000, then, the calculator (10) enters the error mode (303) |
| 303 | In the error mode, the calculator (10) display at (1): "ERR". |
| 302 | If the base number is between 0 and 1000, then, the initial variables are set (304). |
| 304 | 1. The NumProb variable is set to equal the number of problems on the exam which was previously entered. This is the maximum number of problems that can be missed. 2. The GradelistBase variable is set to equal "0". This variable determines which range of scores is displayed. For example, when the GradeList variable equals "0", the scores for 0 through 9 problems missed will be displayed at (1). If the GradeList variable equals "2", the scores for 20 through 29 problems missed will be displayed at (1). 3. The program then calls or interfaces the DisplayGradeList subroutine (305) |
| 305 | The DisplayGradeList subroutine shown and illustrated in FIG. 2 is started. |

With respect to the DisplayGradeList (Display Percentages) subroutine illustrated in FIG. 2; this subroutine calculates the numeric scores (grades) for a range of problems missed. In this embodiment of the invention, 10 scores are calculated and displayed at (1) simultaneously as a grade list. The range of problems missed is indicated by displaying the lowest (at 7), and the highest (at 9) number of problems missed for the corresponding grade list displayed at (1). The maximum number of problems on the exam will also be displayed at (5). The calculator's (10's) indicators are manifested in the present invention at 2, 4, 8, 10A and 12 (text message segments) to identify the numbers displayed and the mode the calculator is in.

This subroutine calculates one grade, appends it to a grade list, then repeats (loops) itself to calculate the next grade. Once 10 grades are calculated, the results are displayed at (1) as a grade list. In a few instances there may be less than 10 grades to display. For example, if there is less than 10 problems, on a given test, exam or part (whole) the subject of analysis.

| Module # | Action |
|---|---|
| 200 | The subroutine is started and first sets the variables (201). |
| 201 | 1. BeginningGrade (Integer) = (equals) GradeListBase * 10 The BeginningGrade variable is identified as an integer (i.e., a whole number with no decimal places) and is set to equal the GradeListBase times (*, or multiplied by) 10. Since the GradeListBase was initially set to "0" (304), the BeginningGrade is also initially "0". The BeginningGrade variable will be used to calculate the grade for the least number of problems missed. This grade will correspond to the left most score in the list of grades displayed at (1). For example, if the GradeListBase were "2", |

-continued

| Module # | | Action |
|---|---|---|
| | | then the BeginningGrade would be "20", and the left most grade displayed at (1) in the grade list would correspond to 20 problems missed. The BeginningGrade value "20" would be stored or later displayed at (7) (or stored for later display). The BeginningGrade variable will also be used to verify that the subroutine has repeated itself 10 times, so that 10 grades will be calculated for simultaneous display. |
| | | 2. GradeList (String) = (equals) " " The GradeList variable is identified as a string and is initially empty. An important aspect of string variables is that items may be appended to them. For example, if a string initially equals (=) "99", one can append the values "95" and "90" to obtain the string "99 95 90". This is the variable that will eventually be displayed at (1) as the grade list. |
| | | 3. ThisGrade (Float) = (equals) BeginningGrade The ThisGrade variable is identified as floating (i.e., a decimal number) and is set to equal (=) the BeginningGrade. Since the BeginningGrade was initially set to "0", ThisGrade is also initially set to "0" The ThisGrade value will be incremented by 1 each time this subroutine is repeated. A numeric grade will be calculated corresponding to each ThisGrade value. The numeric grades will be appended to each other to create the grade list. |
| | | 4. The subroutine now determines how many times it has repeated itself (202). |
| 202 | (1) | If the ThisGrade value is greater than (>) BeginningGrade + (plus) 9, then the values are displayed and the subroutine is exited (203). If the subroutine has repeated itself (looped) 10 times, there will be 10 values in the GradeList string ready for display at (1). |
| 203 | | Display the GradeList at (1), the BeginningGrade value at (7), the ThisGrade value at (9), the NumProb value at (5), turning on the indicators (2, 4, 8, 10A and 12) (test message segments), and exiting the DisplayGradeList subroutine. |
| 202 | (2) | If the ThisGrade value is not greater than BeginningGrade + (plus) 9, then verify that the ThisGrade variable is within an acceptable range (204). If the subroutine has repeated (looped) less than 10 times, there will be less than 10 values in the GradeList string and the subroutine will be repeated. Before repeating, the ThisGrade value must be verified to be within an acceptable range (204). |
| 204 | (1) | If the ThisGrade variable is greater than (>) NumProb, then the grade calculated would be invalid and an indicator must be appended to the GradeList (209). For example, if the subroutine is calculating a grade list for 50 to 59 problems missed, but there are only 55 problems on the exam or given test being analyzed, the scores for 56, 57, 58 and 59 problems missed are invalid. |
| 209 | (1) | Gradelist equal to the GradeList + (plus) "--". Append a "--" symbol to the grade list, indicating an invalid grade for that number of problems or parts missed. |
| | (2) | Continue to the next module and prepare to repeat the subroutine (210). |
| 204 | (2) | If the ThisGrade variable is not greater than Numprob then the grade will be valid, in which case, calculate the grade (205) |
| 205 | (1) | ThisGradeValue = (equals) [Numprob − (minus) ThisGrade] * (times, or multiplied by) [100/ (divided by) Numprob]. This is the standard formula for calculating a percentage score given the number of problems missed (ThisGrade) and the maximum number of problems (Numprob) on a test or exam, or within a given whole or part. The ThisGradeValue variable is the numeric grade corresponding to the number of problems missed (ThisGrade) and will be appended to the GradeList for display at (1). |
| | (2) | The subroutine now checks if ThisGradeValue is 100% (206). |
| 206 | (1) | If ThisGradeValue is 100, then add an indicator to the GradeList (207). Since the display is configured to display 2 numbers per grade, "100" can not be displayed; and "00" can not be used because because it may be mistaken as a 'zero' score. Therefore, a special indicator is used. |
| 207 | (1) | GradeList = (equals) GradeList + (plus) " ". Two blank spaces are appended to the GradeList to indicate a score of 100%. |
| | (2) | Continue to the next module and prepare to repeat the subroutine or step (210). |
| 206 | (2) | If ThisGradeValue is not 100, then the calculated value will be rounded to a whole number and appended to the GradeList (208). |
| 208 | (1) | GradeList = (equals) GradeList + (plus) Integer (ThisGradeValue + 0.5). This equation rounds the ThisGradeValue upward to the next highest integer and appends it to the GradeList. |
| | (2) | Continue to the next module and prepare to repeat the subroutine or step (210). |
| 210 | (1) | ThisGrade = (equals) ThisGrade + (plus) 1. This increments the ThisGrade variable by one. The variable will be used to calculate the next higher number of problems missed and will be used to establish when the subroutine has been repeated 10 times. |
| | (2) | Loop back (202) and repeat the subroutine. |

With respect to the Scroll Down subroutine, illustrated by example in FIG. 4, as a part of the Grade List Mode; the Scroll Down key pad (20) only functions in the Grade List Mode and the Average Mode of the present invention. At all other times it is a 'null', unused or selectively non-functioning key. When utilized, however, the Scroll Down subroutine allows the operator or user of the calculator (10) to increment downward through the grade lists displayed at (1). For example, if the grade list for 30 to 39 problems missed is displayed at (1) and the "Scroll Down" key (20) is pressed, the grade list for 20 to 29 problems missed will be calculated and displayed at (1), and the range indicators, (7) and (9) (the third and fourth display fields, respectively), will change to 20 and 29 respectively.

The Module #, element or process step, within a microprocessor or like means; as a part of the present invention include the following:

| Module # | Action |
|---|---|
| 401 | 1. While in the Grade List mode, the operator or user presses the "Scroll Down" key (20), and the subroutine is started. 2. The minimum range of problems missed is 0 to 10. It must be verified that the current display is not in that range (402). |
| 402 | 1. If GradeListBase − (negative) 1 is less than 0, then go to the DisplayGradeList subroutine (403). If the GradeListBase is already at "0", it can not be decreased. |

-continued

| Module # | Action |
|---|---|
| 403 | Start the DisplayGradeList subroutine shown in FIG. 2. Since the GradeListBase has not been incremented, the results of the DisplayGradeList subroutine will not change and, therefor, the display (33) of the calculator (10) will remain unchanged. This will only occur when the displayed range of problems missed is 0 to 10. |
| 402 | 2. If GradeListBase − (negative) 1, is not less than 0, then decrement, as per the process of variable (404). |
| 404 | 1. GradeListBase = (equals) GradeListBase − (negative) 1. This reduces the GradeListBase variable by 1. 2. Go to the DisplayGradeList subroutine (403). |
| 403 | Start the DisplayGradeList subroutine shown in FIG. 2. Since the GradeListBase has been changed, a new range of values will be calculated and displayed at (33) by the subroutine. The new range will be 10 problems less than the previous range. |

With respect to the Scroll Up subroutine illustrated by example in FIG. 5 as a part of the Grade List Mode of the calculator 10; it is noted that the Scroll Up key (19) only functions in the Grade List Mode and the Average Mode (described in other portions herein) of the calculator (10). At all other times the key (19) is a 'null' or non-functioning key. The Scroll Up subroutine allows the user of the calculator (100 to increment upward (or move up) through the grade lists displayed at the first number display field (1) of the expanded display (33) of the calculator (10). For example, if the grade list for 30 to 39 problems missed is displayed at (1), and the "Scroll Up" key (19) is pressed, the grade list for 40 to 49 problems missed will be calculated and displayed at (1); and the range indicators (7) and (9) (the third and fourth number display fields, respectively) will change to 40 to 49 respectively.

The Module #, process step or element, and the subroutine action, of the present invention regarding the Scroll Up functions, are described as follows;

| Module # | Action |
|---|---|
| 501 | 1. While in the Grade List Mode, the operator or user presses the "Scroll up key (19), and the subroutine is started. 2. The maximum range of problems missed is the range which contains the maximum number of problems on the exam. It must be verified that the current display is not in that range (502). For example, the displayed range of 40 to 49 problems missed is the maximum possible if the number of problems on the exam is 45. The values for 46, 47, 48, and 49 problems missed would be invalid for this case and would be displayed as "--". |
| 502 | 1. If (GradeListBase * [times] 10) + (plus) 10 is greater than Numprob, then go to the DisplayGradeList subroutine (503). This equation determines if the GradeListBase variable is at its maximum allowable value. If it is, it can not be increased and the Scroll Up key (19), when utilized, will not appear to function. The GradeListBase is an integer number corresponding to the range of problems missed ("1" for 10 to 19 problems missed, "2" for 20 to 29 problems missed, etc.), and NumProb is the maximum number of problems on the exam or subject test. |
| 503 | Start the DisplayGradeList subroutine shown in FIG. 2. Since the GradeListBase has not been incremented, the results of the DisplayGradeList subroutine will not change and, therefore, the calculator display (33) will remain unchanged. This will only occur when the displayed range of problems missed is at the maximum possible for a given number of problems on the exam or test. |

-continued

| Module # | Action |
|---|---|
| 502 | 2. If (GradeListBase * [multiplied by, times] 10) + (plus) 10, is not greater than Numprob, then increment the variable (504). |
| 504 | 1. GradeListBase = (equals) GradeListBase + (plus) 1. This increases the GradeListBase variable by 1. 2. Go to the DisplayGradeList subroutine. |
| 503 | Start the DisplayGradeList subroutine shown in FIG. 2. Since the GradeListBase has been changed, a new range of values will be calculated and displayed at (33) by the subroutine. The new range will be 10 problems higher than the previous range. |

The calculator 10 of the present invention is also provided with a Display Average Mode. With respect to entering the Average Mode of the Calculator 10, and the display features at (33) of the calculator, the following is noted. The "Avg Mode" key 30 is pressed, and the average of the list of grades stored in memory (if any) is displayed in the most right portion of the display display at (1), or generally at that location on 33:

| 0 | 1 | 2 | 3 | 4 | 5 | 6 | 7 | 8 | 9 | |
|---|---|---|---|---|---|---|---|---|---|---|
| Number of Grades | | | | | | | | | | 0.00 Grade Average |
| 0 | | | Current Grade | | 0 | | | | | Average Mode |

This will be set forth in the format of "0.00", "000.00", or likewise. In so doing, the following indicators are turned on (or displayed): 2, 3, 6, 11, and 13 (test message segments), with all other indicators (text mesages, etc.) turned off. The number of grades in memory, also indicating the current grade position or index position in memory, is displayed along with the current grade corresponding to the index being displayed; as, for example, presented in the following:

Display (33) will read

| Enter Grade in Calculator | Number of Grades (2) & (3) disp@ (5) | Current Grade (6) display at (7) | Grade Average (13) display at (1) |
|---|---|---|---|
| 85 | 1 | 85 | 85.00 |
| 92 | 2 | 92 | 88.5 |
| 79 | 3 | 79 | 85.33 |
| 100 | 4 | 100 | 89.00 |
| 84 | 5 | 84 | 88.00 |
| 69 | 6 | 69 | 84.83 |
| 97 | 7 | 97 | 86.67 |

With respect to editing a grade, in the Average Mode of the present invention; as the "Scroll Up" key 19 and the "Scroll Down" key 20 are pressed the next grade in the list of entered grades (for averaging) is displayed at (7), and its corresponding location in memory or index is displayed at (5). For example if three grades for averaging were entered as follows: grade 1: 20, grade 2: 30 and grade 3: 40; and the second grade: 30 is presently displayed at (7); pressing the Scroll Down key (20) changes the grade to grade 1: displaying 20 at (7) and 1 at (5); and pressing the Scroll Up key (19), while at the second grade "30" changes the grade to grade 3: displaying "40" at (7) and "2" at (5). The indicators for the display (33): 2, 3, 6, 11 and 13 are turned on and displayed, while all other indicators on the display 33 are turned off. This allows a grade to be selected from the list in memory, and the grade to also be deleted easily from the list of grades in memory, utilizing the "DEL" key 30 as to such a selected grade for deletion. The average displayed at (1) on the display (33) is updated automatically if a grade is deleted, to then reflect the resulting final overall average after a grade is deleted.

With respect to entering a grade, while using the Average Mode of the present invention; a grade is entered using the number keys and then pressing the "ADD" (or "ADD GRADE") key 28, which then displays the number added at (7) of the display (33). The indicator, test message segment 6 turns off during grade entry. The grade is then stored in memory in the position as indicated (indexed) at the second number display field (5). In this preferred embodiment of the invention, grades are always entered at the end of a given list of grades to be averaged, not inserted into the middle of the list.

The flowcharts set out in FIGS. 6, 7, 8, 9, 10 and 11; are illustrative of portions of the Average Mode of the present invention. Various types and formats of software implementation can be utilized to achieve the process and functional steps, such that an overall average can be novelly displayed, along with the index number of the specific grade of a list of grades to be averaged and the actual grade itself. For purposes of definition within the Average Mode, the following terms and descriptions apply:

| Variable Names | Description |
| --- | --- |
| GradeListIndex: | The GradeListindex variable constitutes or acts as a 'pointer' which identifies a specific grade in the grade list. If the grades were sequentially listed on a page with numbered lines, the Gradelistindex would be the line numbers. It is, therefore, used to determine which grade in the list (of grades to be averaged) is displayed at (7) as the Current Grade (6). Accordingly, the first grade entered (for averaging) will have a GradeListIndex of "1", and the GradeListIndex will increase by 1 for each grade entered (for averaging). The largest Gradelistindex value will be equivalent to the total number of grades entered. |
| Current Grade: | The Current Grade is the grade that is displayed at (7), and it corresponds to the current GradeListindex value (i.e., that grade in the list of grades entered which is actually displayed at a given time). |
| Number of Grades: | This value is utilized to indicate which grade in the list of grades is being viewed as the 'Current Grade'. It is functionally equivalent to the current GradeListIndex value. For example, if the third grade in the grade list was "98", when "3" (the corresponding GradeListIndex value) is displayed just adjacent to the Number of Grades text messages (2) and (3), at the second number display field (5); the number "98" will be displayed adjacent to the Current Grade text message segment (6), at the third number display field (7). |

Figure 6:
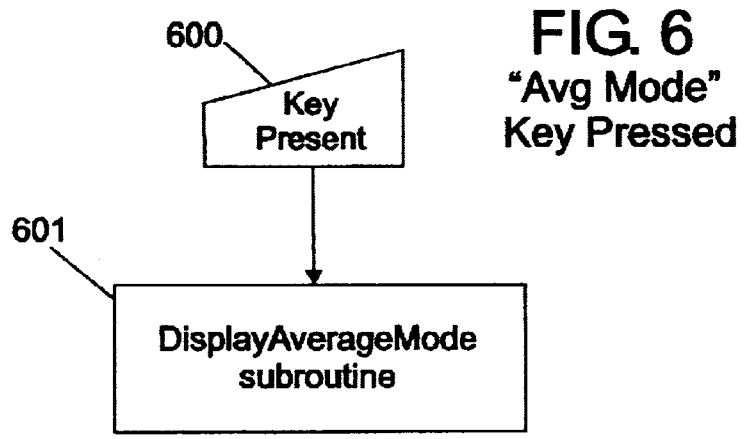
FIG. 6 is an exemplar flow chart illustrating the "Avg Mode" Key Pressed Subroutine as it relates to preferred embodiments of the Averaging Mode (Display Average Mode) of the calculator of the present invention.

With respect to entering the Average Mode of the calculator 10 of the present invention, as illustrated in FIG. 6; this routine describes how the average mode is entered, how the average is calculated, the values that are displayed at (1), (5) and (7), and the indicators (text message segments) that are displayed at (2), (3), (6), (11) and (13):

| Module # | Action |
| --- | --- |
| 600 | The operator or user presses the "AVG" (or "AVG MODE") key (30), and the Average Mode subroutine is started (601). |
| 601 | If there are values stored in memory then their average is calculated utilizing the in-structured software, algorithm, or coded structural/functional equivalent of the equation: $$\text{Overall or Final Grade Average} = \left\{ \frac{\sum G_k}{\sum M_k} \right\}_{K=1}^{K=N},$$ where: $G_k$ = (equals) the individual grade $M_k$ = the maximum possible grade score $n$ = total number of grades entered $k$ = range variable; or, where 100% is assumed to be the top average, then, the equation: $$\left\{ \frac{\sum G_k}{N} \right\}_{K=1}^{K=N}$$ Display at (1) (first number display field) the calculated Overall or Final 'Grade Average' (in calculated in accordance with the above listed equations); the 'Grade Average' value is displayed in the format of "000.00" or "0.00". The Number of Grades (the current GradeListIndex value) is displayed at (5) (second number display field). The grade corresponding to the current GradeListIndex value as the "Current Grade" (6) is displayed at (7) (third number display field). And the proper indicators for this Mode of the invention and calculator (10) are displayed and turned on as follows: "Number of Grades" (2) and (3), "Current Grade" (6), "Average Mode" (11) and "Grade Average" (13). If there are not values stored in memory then zero the display (33): Turn on the proper indicators (2, 3, 6, 11, and 13) (text message segments), and place zeroes in the display number display fields for Average (1) ("0.00"), Number of Grades (5) ("Q"), and Current Grade (7) ("0"). |

Figure 7:
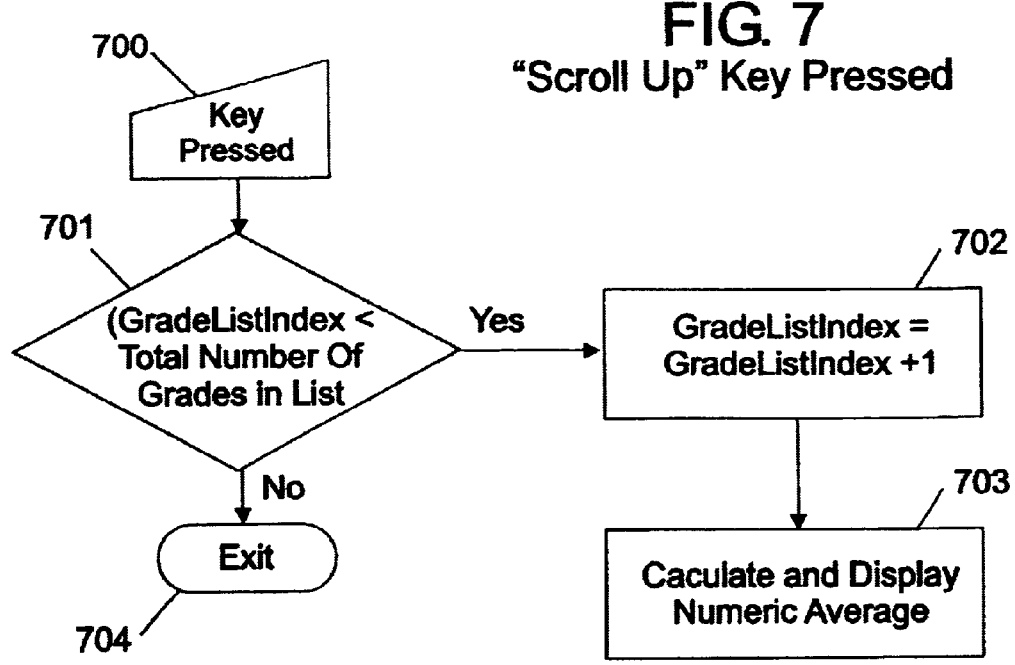
FIG. 7 is an exemplar flow chart illustrating the "Scroll Up' Key Pressed Subroutine as it relates to preferred embodiments of the Averaging Mode of the calculator of the present invention.

With respect to the Scroll up subroutine of the Average Mode of the present invention and calculator (10), illustrated, by example, in FIG. 7; the "Scroll Up" key (19) only functions in the 'Average Mode' or the 'Grade List Mode' of the calculator. It is 'null' or non-functional (or non-activating) as to pressing this key (19) at all other times in utilizing the calculator (10).

The following Scroll Up subroutine, as a preferred embodiment of the invention, enables the operator or user of the calculator (10) to scroll upward through the list of grades that have been entered in the calculator while being utilized in the 'Average Mode'. During this scrolling function, the Current Grade (6) value displayed at (7) (third number display field) and the Number of Grades (2 and 3) value displayed at (5) (the second number display field) are the only number display fields that change on the expanded display (33).

The structural and functional aspects, for which various programming, coding or software can be adapted, can be set forth as follows:

| Module # | Action |
|---|---|
| 700 | 1. While in the 'Average Mode' of the calculator (10), the operator or user presses the Scroll up key (19) and this subroutine is started.<br>2. A check is made to see if the Current Grade (6) displayed at (7) (the third number display field), is the last grade in the grade list (701). |
| 701 | 1. If the current value of the GradeListIndex variable is less than the total Number of Grades in the grade list (the maximum GradeListIndex value), then increment the GradeListindex (702). The maximum possible GradeListIndex value is equal to the total Number of Grades in the grade list and it corresponds to the last grade on the grade list. If the last grade on the grade list is not currently being displayed at (7) (the third number display field), then the GradeListIndex value is not at its maximum and it can be incremented so that the next grade in the grade list will be displayed at (7) when the 'Average Mode' subroutine, illustrated at FIG. 6, is run. |
| 702 | 1. GradeListIndex = (equals) GradeListIndex + (plus) 1.<br>This equation increases the GradeListIndex by 1 in preparation to run the Average Mode (FIG. 6) routine.<br>2. Go to the Average Mode subroutine shown in FIG. 6 Since the GradeListIndex was increased by 1, the Average Mode subroutine will display at (7) (third number display field) the next grade in the grade list as the Current Grade (6), and display its corresponding GradeListIndex value at (5) (second number display field) adjacent to the indicator, "Number of Grades"(2 & 3). Because none of the grade list values were changed, the "Grade Average" (13) value displayed at (1) (first number display field) remains unchanged. |
| 701 | 2. If the current value of the GradeListIndex variable is not less than the total Number of Grades in the grade list (the maximum GradeListIndex value), then exit the subroutine (704) If the last grade on the grade list is already being displayed, the GradeListIndex variable is at the maximum possible value and cannot be incremented or raised. Therefore, exit the subroutine without making changes. |
| 704 | Exit the subroutine. |

Figure 8:
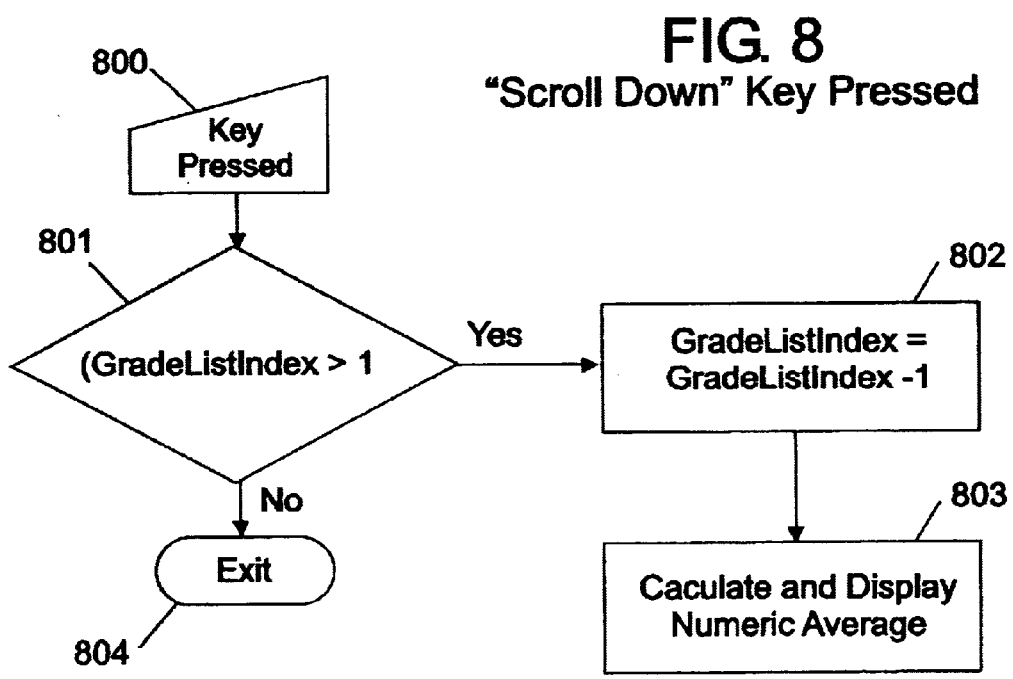
FIG. 8 is an exemplar flow chart illustrating the "Scroll Down" Key Pressed Subroutine as it relates to the preferred embodiments of the Averaging Mode (or Display Average mode Subroutine) of the calculator of the present invention.

The Scroll Down subroutine of the 'Average Mode' of the calculator (10) is illustrated by example in FIG. 8. The Scroll Down key (20) only functions while in the 'Average Mode' or in the 'Grade List Mode'. This key (20) is a null or non-functioning key at all other times. The Scroll Down subroutine in preferred embodiments of the invention enables the calculator user to scroll downward through the list of grades that have been entered in the calculator (for obtaining an overall average thereof) while the calculator (10) is in the 'Average Mode'. During scrolling, the Current Grade value displayed at (7) and the Number of Grades value displayed at (5), are the only number a display fields that change (in presenting different values on the list) on the display (33).

Structural and functional aspects which can be instituted by various software, programming, coding, etc., a part of the Scroll Down subroutine include the following:

| Module # | Action |
|---|---|
| 800 | 1. While in the Average Mode of the calculator (10), the operator presses the Scroll Down key (20), and the subroutine is started.<br>2. A Check is done to see if the Current Grade displayed at (7) is the first grade in the grade list (801). |
| 801 | 1. If the current value of the GradeListIndex variable is greater than 1, then decrease the GradeListIndex value by 1 (802).<br>The minimum possible GradeListIndex value is the value "1", and it corresponds to the first grade on the grade list. If the first grade on the grade list is not currently being displayed at (7), then the current GradeListIndex is not "1" and it can be decreased so that the previous grade in the grade list will be displayed at (7) when the Average Mode subroutine (of FIG. 6) is run. |
| 802 | 1. GradeListIndex = (equals) GradeListIndex - (negative) 1.<br>This equation decreases the GradeListindex by 1 in preparation to run the Average Mode (FIG. 6) subroutine.<br>2. Go to the Average Mode subroutine shown in FIG. 6. Since the GradeListIndex value was decreased by 1, the Average Mode subroutine will display at (7) the previous grade in the grade list as the Current Grade (6), and its corresponding GradeListIndex value as the Number of Grades (2 and 3), displayed at (5). Since none of the grade list values were changed, the Grade Average (13) displayed at (1) remains unchanged. |
| 801 | 2. If the GradeListIndex variable is not greater than 1, then exit the program (804).<br>If the first grade on the grade list is being displayed, the current GradeListIndex value is "1", which is the minimum possible value. Therefore, exit the subroutine without making changes. |
| 801 | Exit the subroutine. |

The "Enter Grade" subroutine is part of the Average Mode of the calculator (10), and is illustrated by example in FIG. 9. This subroutine automatically calculates the new 'Grade Average' (or overall Grade Average) when a grade is appended or added. In this routine the Grade Average (13) displayed at (1), the Number of Grades (2 and 3) displayed at (5) and the Current Grade (6) displayed at (7), as each of these are displayed at their respective number display fields, will change on the display (33).

This subroutine is described structurally and functionally as follows, and can be implemented in a number of ways:

| Module # | Action |
|---|---|
| 900 | 1. While in the Average Mode, indicated by text message segment (11), the operator of the calculator (10) enters a new grade using the numeric keys 21 (Individual Numbers), and presses the ADD (or ADD GRADE) key (28).<br>2. Append the grade list (901). |
| 901 | 1. Insert the new grade at the end of the grade list and create a corresponding GradeListIndex value equal to the previous maximum GradeListIndex value + (plus) 1. New grades are always entered at the end of the grade list. The GradeListIndex value for the new grade will also be the new "maximum" GradeListIndex value. It will be 1 more than the previous maximum value since 1 (one) grade has been added to the list. The maximum GradeListIndex value is equivalent to the total number of grades in the grade list.<br>2. Proceed to the next module (902) |
| 902 | Start the Average Mode subroutine shown in FIG. 6. The Average Mode subroutine will calculate and display at (1) a new Grade Average for the appended grade list. The newly entered grade will be displayed at (7) as the Current Grade; and the corresponding GradeListIndex value will be displayed at (5) as the Number of Grades. |

The 'Delete Grade' subroutine of the Average Mode of the calculator (10) is illustrated by example in FIG. 10. This subroutine allows the operator of the calculator (10) to remove grades from the grade list (list of grade values to be averaged).

This Delete Grade subroutine automatically calculates the new Grade Average (overall Average) when a grade is deleted. When this subroutine is utilized, the first number display field (1), adjacent to the "Grade Average" text message (1) indicator will change in the value displayed. Additionally, on the display (33), the third number display field (7), adjacent to the "Current Grade" text message (6) indicator (on), will change in the value displayed. Also, if the value being deleted on the grade list is the last value on the grade list (the highest index number on the list); the value displayed at the second number display field (5), adjacent to the "Number of Grades" (2 and 3) text message indicators (on), will change in the value displayed by reducing its index value by 1.

The Delete Grade subroutine is described as follows:

| Module # | Action |
|---|---|
| 1000 | 1. While in the Average Mode, the operator of the calculator (10) scrolls through the grade list using the Scroll Up key (19) or the Scroll Down key (20). When the grade that the operator wishes to delete is displayed at the number display field (7) as the "Current Grade" (6) (text message indicator on), the operator presses the "DEL" (or "DEL GRADE") key (29).<br>2. Remove the grade (1001). |
| 1001 | 1. Delete the grade from the grade list.<br>It is noted that all of the GradeListIndex values which are greater than the current value (being deleted) will be decreased by "1", since one grade is being removed. For example, if there are four grades entered for averaging, and the third grade on that list (GradelistIndex of "3") is displayed at (5) adjacent to Number of Grades (2 & 3), and is the grade value of "63" to be deleted; and the fourth grade (GradeListIndex of "4") entered on the list is the grade value "64"; when the third grade "63" is deleted by step (1000), then the fourth grade (GradeListIndex of "4") is reduced to Index of "3" and the former fourth grade "64" becomes the third grade "64", with GradeListIndex of "3".<br>The grades and corresponding GradeListIndex values which are earlier in the grade list (in the example GradeListIndex's "1" and "2") are unaffected by the deletion of the third GradeListIndex value.<br>2. Proceed to the next module (1002). |
| 1002 | Start the Average Mode subroutine shown in FIG. 6. The Average Mode subroutine will calculate and display at (1) (first number display field) a new Grade Average (indicator 13 on) for the edited grade list. The next grade in the grade list will be displayed at (7) (third number display field), as the Current Grade (indicator 6 on); and the corresponding GradeListIndex value will be displayed at (5) (second number display field) to indicate the Number of Grades (indicators 2 and 3 on). It is noted that the Number of grades value displayed at (5) will not actually change, since the GradeListIndex values were decreased by 1 to correct for the deleted grade. |

The Clear Average subroutine, a part of the Average Mode of the calculator (10) is illustrated by example in FIG. 11. This subroutine allows the operator to clear all grades from the grade list used in the Average Mode. This would, or might, typically be done prior to entering a new set of data. The Clear Average subroutine is described as follows:

| Module # | Action |
|---|---|
| 1100 | 1. While in the Average Mode, the operator of the calculator (10) presses the "CLR AVG" key (18).<br>2. Begin the Clear Average subroutine (1101). |
| 1101 | 1. Delete all grades in the grade list.<br>2. Go the next module (1102). |
| 1102 | Go to the Average Mode subroutine shown in FIG. 6. The Average Mode subroutine will not find any values in the grade list and will display zeros adjacent to the Grade Average (indicator 13 on) at the display field (1) ("0.00"), adjacent to the Number of Grades (indicators 2 & 3 on) at the display field (5) ("0"), and adjacent to the Current Grade (indicator 6 on) at the display field (7) ("0"). As stated, the preferred embodiment's indicators (2, 3, 6, 11 and 13) will also be on and displayed. |

The Test Timing Mode is an additional mode of operation provided in preferred embodiments of the invention and calculator (10). With respect to the preferred embodiments of the calculator (10), shown at FIGS. 1 and 1A; the following operation can be utilized within the scope of the invention:

1. The Time key (36) when pressed will alternate between the two submodes available for use: (a) TIME OF DAY and (b) COUNTDOWN TIMER.

2. When in the COUNTDOWN TIMER submode, pressing the "+" (24) and (shown in FIG. 1 as 25, and in FIG. 1A as 25/37B) keys will enter digits into or onto the display (33), and pressing the "=" key (shown in FIG. 1 as 23, and in FIG. 1A as 23/37A) will start the countdown. When the countdown timer counts down to zero, an audible alarm will sound. Pressing any key can turn off the alarm or it will stop, or cease sounding, automatically after one minute.

3. When in the TIME OF DAY submode, pressing the "AC" key (16) will place the calculator (10) into the CALCULATOR mode. To set the time, the "SET" key (23) must be pressed. Pressing the "+" and "−" keys will enter digits into or onto the display (33). Once all of the digits have been set, the "SET" key (23) is pressed again and the clock will start running.

Pressing the "AC" key (16) will change the calculator (10) to the CALCULATOR mode; and from this mode, pressing the appropriate keys will access any of the other modes, selected from those described herein.

4. While setting the time, the clock should continue to run normally and the time will not change unless the "SET" key (23) is pressed to complete setting of the correct time.

5. Pressing the "AC" key (16) will always change from wherever it is to the CALCULATOR mode.

6. In the TIME OF DAY mode the "Start/Stop" switch or key (shown in FIG. 1 as element 37, and in FIG. 1A as elements 23/37A and 25/37B), when pressed, will have no effect.

7. In the COUNTDOWN TIMER submode the "Start/Stop" key will Start or Stop the COUNTDOWN TIMER. If the COUNTDOWN TIMER is stopped at 'Zero', then, the next time the "Start/Stop" key is pressed, this will reset to the stored time displayed on digits (which can vary in preferred embodiments of the invention) set forth on the first number display field (1) of the display (33) as entered on subelements (1-1), (1A), (2-1), (2A), (3-1), (3A), (4-1) and (4A), of the numeric subdisplay fields (50), marked for illustration purposes as the index number segments (14): "0", "1", "2" and "3"; as illustrated in FIG. 1C and other drawings; and begin counting down, again. Pressing and holding the "=" key (referenced above) in the COUNT- DOWN TIMER submode will reset the COUNTDOWN TIMER to the starting time (stored beginning time as described just above).

8. In any non-Time mode, the "Start/Stop" key will have no effect. The calculator (10) will change to TIME OF DAY submode after a period of non-use.

Figure 13:
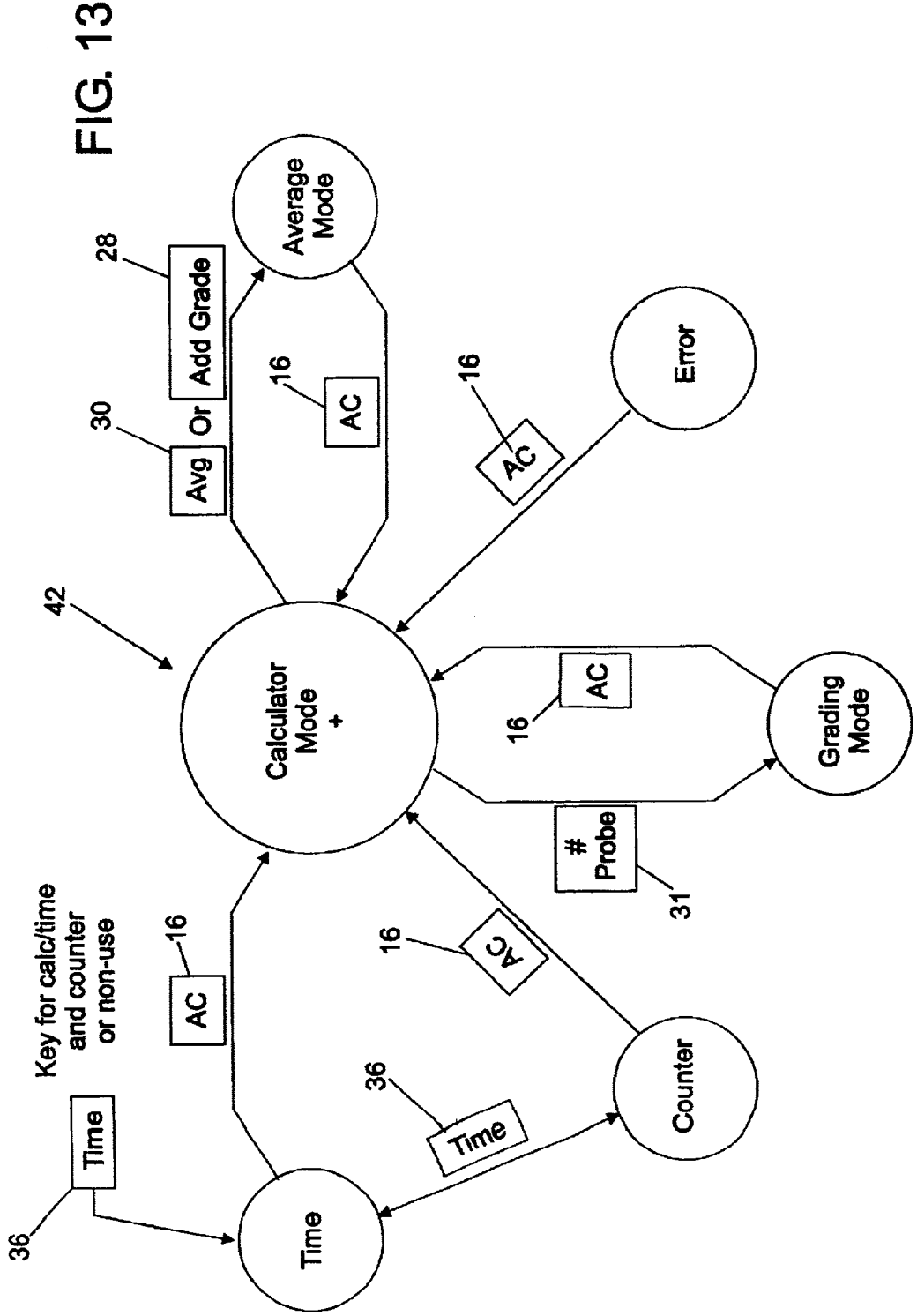
FIG. 13 is an exemplar, functional block-type diagram (or functional flow chart) illustrating the relationship, in one embodiment of the invention, between the Calculator Mode and other Modes and subroutines of the calculator of the present invention.

The integration of structural and functional aspects of the calculator (10) and the Modes and submodes which are part and parcel thereof, as shown and illustrated, be example, as a part of the preferred embodiments of the invention, in FIG. 12 and 13.

Another preferred embodiment of the invention and calculator (10), is shown and illustrated, by example, at FIG. 1A. It is noted that this embodiment is similar to that of FIG. 1, with some exceptions. Those exceptions include, without limitation, for example, that the "SET" (or SET TIME) key (23) is a separate key pad, positionally placed proximate to the upper left of the keypad assembly (34), of FIG. 1A; rather than at the lower right positional area, as a part of the "=" ('equals') key as illustrated, by example, in FIG. 1. Accordingly, in the preferred embodiment illustrated in FIG. 1A, the originally described START/STOP key (37) is utilized in the form (with respect to the TIME submodes) of the START TIME key (doubling as the '=' key) 23/37A and the STOP TIME key (doubling as key) 25/37B Additional exceptions or positional differences of '−' the key placement between FIG. 1 and FIG. 1A, also include the keys "# PROBL" (31), "CLR AVG" (18), and the location difference of the "AC" key (16). Minor positional differences also exist as to key (17) (Backspace key) and the SCROLL UP and SCROLL DN keys (keys 19 & 20, respectively), the scroll up functions being symbolized on the key as an 'arrow' symbol pointing upward to the display (33), and the scroll down function being symbolized as an 'arrow' symbol facing downward or in the opposite direction from that of the scroll up key.

Examples of use of preferred embodiments of the invention follow, making reference to the special features of FIG. 1A, and the other elements of the calculator (10) illustrated and discussed with regard to FIG. 1.

EXAMPLES REGARDING 'DATE AND TIME'

The calculator (10) will display the 'Date and Time' when it is not in use, in preferred embodiments of the invention.

To set the calendar and clock features of the calculator (10), the user presses the |SET| key (23). The AM/PM indicator will be displayed, and four (4) digits will begin to flash. The User utilizes the |+| (24) and |−| (25/377) keys to adjust the 'hour'.

A user presses the |SET| key (23) again. The minutes will begin to flash. One uses the "+" (24) and "−" (25/378) keys to adjust the minutes. An example of the appearance of the expanded display (33) in this submode is as follows:

(Month, Day, Year)

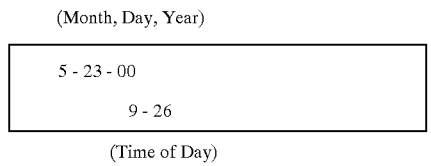

| 5 - 23 - 00 |
| 9 - 26 |

(Time of Day)

The User presses the "SET" key (23) again. The month will begin to flash. One utilizes the "+" (24) and "−" (25/378) keys to adjust the month.

The user presses the "SET" key (23) again. The day will begin to flash. One uses the "+" (24) and "−" (25/37B) keys to adjust the day.

One presses the "SET" key (23) again. The year will begin to flash. One uses the "+" and "−" keys to adjust the year.

The user presses the "SET" key (23) again to complete setting the 'Date and Time'.

After a period of non-use in any other Mode or submode of the calculator (10) will automatically display the 'Time of Day'.

SETTING TIME AND DATE

| Remarks | Keys to Press | Display will read |
|---|---|---|
| Put batteries in the calculator | We are in the date and time mode | 1-1-00  12-00 |
| Set clock to 6:30 pm | |SET| (23) | 1-1-00 A  12-00 |
| Hour digits start flashing | Hold down |+| until "A" becoms "P" and "6" is displayed | 1-1-00 P  6-00 |
| Now set minutes | |SET| | 1-1-00 P  6-00 |
| Minute digits start flashing | Hold down |+| until "30" is displayed | 1-1-00 P  6-30 |
| Now set year to 5-28-00 | |SET| | 1-1-00 P  6-30 |
| Year digit starts flashing | Set "00" is already displayed | 1-1-00 P  6-30 |
| Now set month | |SET| | 1-1-00 P  6-30* |
| Month digits start flashing | Hold down |+| until "5" is in the display | 5-1-00 P  6-30* |
| Now set day | |SET| | 5-1-00 P  6-30* |
| Date digit starts flashing | Hold down |+| until "28" is in the display | 5-28-00 P  6-30* |
| The setting of the Time and Date is complete | |SET| | 5-28-00 P  6-30* |

*Minutes digits may have changed to 31, 32, 33, etc by this time.
"SET" key (23)
"+" (24)

EXAMPLES REGARDING THE 'CALCULATOR' (STANDARD MATHEMATICS) MODE

Any time during the utilization of various Modes, submodes or functions of the calculator (10) set forth herein, the user can press the |AC| key (16) to use the Calculator Mode of the invention. The calculator (10) will then operate as a standard four-function calculator with memory; and the user will utilize the 'Individual Numbers' keys (21), the four mathematical function keys "+" (plus) (24), "−" (negative) (25/37B), 'Division' (27) and "×" (Multiplication) (26), and the Memory keys (15).

The user presses the "M+" key, of the memory keys (15), to add a number displayed on the expanded display (33) to the calculator's (10) memory.

The user presses the "M−" key, of the memory keys (15), to subtract a number displayed at (33) from the memory.

One presses the "MR" key, of the memory keys (15), to replace a number displayed at (33) with a number already in memory and clear the memory.

The backspace key (17) (→) will allow the user to correct mistakes one digit at a time, for mathematical processes for which the Calculator is being utilized.

STANDARD CALCULATOR MODE

| Remarks | Keys to Press | Display will read |
|---|---|---|
| Go to Calculator Mode | AC (16) | 0. |
| Enter 6 8 9 | 6 8 9 | 689. |
| Add 5 3 . 2 | + 5 3 . 2 | 53.2 |
| Equals | = (23/37A) | 742.2 |
| Multiply by 600 | X 6 00 | 600. |
| Equals | = | 445320. |
| Divide by 175 | ÷ 1 7 5 | 175. |
| Equals | = | 2544.6857 |
| Subtract 369.22 | - 3 6 9 . 2 2 | 369.22 |
| Equals | = | 2175.4657 |
| Clear display | AC | 0. |
| Go back to "Clock and Date Mode" | TIME (36) | 5-28-00<br>6-34<br>(Time may read different) |

Keys utilized above:
"AC" (16)
"+" (24)
Individual Numbers keys (21)
Decimal Point (".") (22)
"=" (23/37A)
"–" (25/37B)
"÷" (Divide) (27)
"TIME" (36)

EXAMPLES UTILIZING THE GRADING (OR PERCENTAGE) MODE

As indicated, the calculator (10) will display a list of grades according to the number of problems on a test and the number of incorrect answers. For example, if there were 27 (twenty-seven) problems on an exam or test, while using the calculator (10), the teacher or user enters the number "27" (using the Individual Numbers keys 21). In so doing, the number "27" will appear in the expanded display (33). The user presses the "# PROB" key (31). This lets the calculator know, and the separate memory or memory within the processor (42) (or microprocessor means) know that there are '27' problems on the test. The calculator (10) will immediately display the grades at the number display field (1), from left to right, for the first ten incorrect problems; as illustrated in FIG. 1A. Under the '0' label portion of the index number segments (14), one notes the existence, in this case, of 'blank' digit space areas, since '0' incorrect is presumed to be a grade of "100" (or 100%). In this case, one also notes that under the '5' label portion of the index number segments (14), that the two digit number "81" is displayed, indicating that missing '5' problems results in a grade of "81".

If more than '9' problems are missed on an exam, the teacher or user needs to review the grade list for the corresponding number missed. The user utilizes the SCROLL UP key (19) (key having the symbol of an arrow head aiming upward), to display the next list of grades for missing from "10" to "19" problems on an exam. On the display (33), the "Number Wrong" text message segment (10A) will indicate adjacent thereto at number display fields (7) and (9), the displayed beginning and ending number missed for the current display list, with the number "10", in this case, being displayed at (7) and the number "19" being displayed at (9).

The user presses the SCROLL UP key (19) again to display the next list of grades for missing "20 to 29" problems (note the dash, text message segment 8 indicator). Because, in this case example there are only "27" problems (as displayed at 5), the last two grades in this list, respectively under the '8' and '9' label portions of the index number segments (14), will show or display the designation, "—", because this number missed exceeds the number of problems on the exam.

The user presses the "SCROLL DN" key (showing the symbol on the key of an arrow head aiming downward), to move back, within the grade list, to fewer problems missed, as this example test.

GRADE MODE

| Remarks | Keys to Press | Display will Read |
|---|---|---|
| Go to calculator mode | AC (16) | 0. |
| Enter "42" | 4 2 | 42. |
| Enter this as number of problems | # PROB (31) | /98/95/93/90/88/86/83/81/79<br>NO WRONG   GRADE MODE<br># of Problems 42   0 to 9 |
| Scroll up to next sequence | ▲ (19) | /76/74/71/69/67/64/62/60/57/55<br>NO WRONG   GRADE MODE<br># of Problems 42   10 to 19 |

-continued

GRADE MODE

| Remarks | Keys to Press | Display will Read |
|---|---|---|
| Scroll up to next sequence | ▲ | /52/50/48/45/43/40/38/36//33/31 NO WRONG GRADE MODE # of Problems 42  20 to 29 |
| Scroll back down | ▼ (20) | /76/74/71/69/67/64/62/60/57/55 NO WRONG GRADE MODE # of Problems 42  10 to 19 |
| Enter 17 | 1 7 | 17. |
| Enter this as number of problems | # PROB | /94/88/82/76/71/65/59/53/47 NO WRONG GRADE MODE # of Problems 17  0 to 9 |
| Scroll up to next sequence | ▲ | 41/35/29/24/18/12/6/0/--/-- NO WRONG GRADE MODE # of Problems 17  10 to 17 |
| Back to Calculator Mode | AC | 0. |
| Go back to number of problems | # PROB | /94/88/82/76/71/65/59/53/47 NO WRONG GRADE MODE # of Problems 17  0 to 9 |
| Back to Calculator Mode | AC | 0. |

Keys Utilized Above:
"AC" (16)
'Individual Numbers' Keys (21)
"# PROB" (31)
"SCROLL UP" (19)
"SCROLL DN" (20)

EXAMPLES UTILIZING THE GRADE AVERAGING MODE

The calculator (10) will allow the user to enter up to '100' grades (to obtain a final or overall averaging result) and will automatically display the average on the expanded display (33), at the first number display field (1), under or adjacent to the '8' and '9' label portions of the index number segments (14). In so doing, this permits the percentage (or Final Average Amount) obtained to be accurate in displaying less than a 'whole' single unit, to two (2) decimal places to the 'right', or to the displayed accuracy to the 'hundredths' of a single whole unit constituting the Final or Overall Average of the numbers entered on the average list in the calculator (10).

Additionally, within this Mode, in the present invention, the user can 'SCROLL' through (UP 19 or DOWN 20) the list of grades and view or delete them.

To begin grade-averaging from the calculator (10), the user presses the "AVG" key (30).

The user enters each grade in the calculator (10), utilizing the 'Individual Numbers' keys (21), and then presses the "ADD" key (28). As each new grade is entered the portion of the number display field (1), adjacent to the indicating text message segment, "Grade Average" (13), will display the new average value.

In the Average Mode of the present invention, each grade is numbered and stored so that the grades can be recalled or reviewed by pressing the "SCROLL UP (19) and "SCROLL DN" (20) keys.

If the user wishes to delete the grade that the user is viewing, this can be done by pressing the "DEL" key (29). The grade will then be removed and the overall "Grade Average" displayed at (1) will reflect the new average value (upon deleting one of the grades on the list).

To clear the average list for a new list of grades, the user presses the "CLR AVG" key (18).

To exit the Grade Average Mode of the calculator (10), the user presses the "AC" key (16).

AVERAGE MODE

| Remarks | Keys to Press | | | Display will Read |
|---|---|---|---|---|
| Go to Average Mode | AVG (30) | Number of Grades | Current Grade | 0.00 Grade Average |
| | | 0 | 0 | Average Mode |
| Enter "89" | 8 9 (21) | Number of Grades | Current Grade | 0.00 Grade Average |
| | | 0 | 89 | Average Mode |
| Enter Grade | ADD (28) | Number of Grades | Current Grade | 89.00 Grade Average |
| | | 1 | 89 | Average Mode |
| Enter "74" | 7 4 | Number of Grades | Current Grade | 89.00 Grade Average |
| | | 1 | 74 | Average Mode |
| Enter Grade | ADD | Number of Grades | Current Grade | 81.50 Grade Average |
| | | 2 | 74 | Average Mode |

-continued

AVERAGE MODE

| Remarks | Keys to Press | Display will Read | | |
|---|---|---|---|---|
| Enter "93" | 9 3 | Number of Grades | Current Grade | 81.50 Grade Average |
| | | 2 | 93 | Average Mode |
| Enter Grade | ADD | Number of Grades | Current Grade | 85.33 Grade Average |
| | | 3 | 93 | Average Mode |
| Enter "65" | 6 5 | Number of Grades | Current Grade | 85.33 Grade Average |
| | | 3 | 65 | Average Mode |
| Enter Grade | ADD | Number of Grades | Current Grade | 80.25 Grade Average |
| | | 4 | 65 | Average Mode |
| Enter "100" | 1 00 | Number of Grades | Current Grade | 80.25 Grade Average |
| | | 4 | 100 | Average Mode |
| Enter Grade | ADD | Number of Grades | Current Grade | 84.20 Grade Average |
| | | 5 | 100 | Average Mode |
| Scroll Down | ▼ (20) | Number of Grades | Current Grade | 84.20 Grade Average |
| | | 4 | 65 | Average Mode |
| Delete Grade | DEL (29) | Number of Grades | Current Grade | 89.00 Grade Average |
| | | 4 | 100 | Average Mode |
| Enter 76 | 7 6 | Number of Grades | Current Grade | 89.00 Grade Average |
| | | 4 | 76 | Average Mode |
| Enter Grade | ADD | Number of Grades | Current Grade | 86.40 Grade Average |
| | | 5 | 76 | Average Mode |
| Scroll Down 3 spaces | ▼ ▼ ▼ (20) | Number of Grades | Current Grade | 86.40 Grade Average |
| | | 2 | 74 | Average Mode |
| Clear Averages | CLR AVG (18) | Number of Grades | Current Grade | 0.00 Grade Average |
| | | 0 | 0 | Average Mode |
| Enter "93.7" | 9 3 . 7 (21) (22) | Number of Grades | Current Grade | 0.00 Grade Average |
| | | 0 | 93.7 | Average Mode |
| Change the "7" | ▶ (17) | Number of Grades | Current Grade | 0.00 Grade Average |
| | | 0 | 93. | Average Mode |

AVERAGE MODE -continued

| Remarks | Keys to Press | Display will Read | | |
|---|---|---|---|---|
| Make "7" a "5" | [5] | Number of Grades | Current Grade | Grade Average |
| | | 0 | 93.5 | 0.00 Average Mode |
| Enter Grade | [ADD] | Number of Grades | Current Grade | Grade Average |
| | | 1 | 93.5 | 93.5 Average Mode |
| Enter "91.2" | [9][1][.][2] | Number of Grades | Current Grade | Grade Average |
| | | 1 | 91.2 | 93.5 Average Mode |
| Enter Grade | [ADD] | Number of Grades | Current Grade | Grade Average |
| | | 2 | 91.2 | 92.35 Average Mode |
| Go back to Calculator Mode | [AC] (16) | 0. | | |

EXAMPLES UTILIZING THE 'TIMER' SUBMODE

The 'Timer' function or feature of the calculator (10) can be utilized by a Teacher or User to time Tests/Exams/Quizzes or other activities.

To utilize the 'Timer' the user presses the "TIME" key (36) once (one time) while the Date and Time is displayed in the expanded display (33). Two groups of digits or numbers will appear in the display (33). The group of digits on the left is the starting time and the group on the right counts down the time:

| Countdown Timer Length | Countdown Time |
|---|---|
| 1 - 30 - 00 | 0 - 18 - 28 |
| 9 - 26 | |
| Time of Day | |

To set the 'Timer' the user presses the "SET" key (23). Upon doing this, the hour digits in the group of digits on the 'left' will begin to flash. The user utilizes the "+" key (24) ('plus' sign key) and the "−" key (25/37B) ('negative' sign key) to adjust the hour. The user presses the "SET" key (23) again. The minutes will begin to flash. The user utilizes "+" key (24) or the "−" key (25/37B) to adjust the minutes. The user presses the "SET" key (23) again. The 'seconds' will begin to flash. The user then utilizes the "+" (24) or "−" (25/37B) keys to adjust to the 'seconds' desired. The user then presses the "SET" key (23) again to complete setting the 'Timer'.

The user presses the "START" OR "" (equals sign) key (23/37A) to start the 'Timer'. The countdown is displayed on (1) of (33), on the group of digits on the right side of the display (33).

The user presses the "STOP" OF "−" (negative sign) key (25/37B) to stop the 'Timer'. The "START" or "=" key (23/37A) being pressed will restart the 'Timer'.

The user presses the "SET" key (23) four times (or 4 separate times) to 'Clear' the countdown and start over.

Once the counter is started, the calculator (10) can be used in any of the other Modes and the countdown will continue. The user presses the "TIME" key (36) twice (or 2 separate times) to view the 'Timer'.

The 'Timer' will beep (or make an audible sound) for one minute (1 minutes duration), at the end of the countdown time. Pressing any key will stop the beeping or sound.

Test Timer

| Remarks | Keys to Press | Display will Read | |
|---|---|---|---|
| Go to Time Calender Mode | [TIME] (36) | 5-28-00 | 6-59 (Time could be different) |
| Go to Timer Mode | [TIME] | 0-00-00 | 0-00-00 6-59 |
| Set Timer for 3 hrs 23 mins | [SET] (23) | 0-00-00 | 0-00-00 6-59 |
| Hour digit starts flashing | Press [+] until "3" is displayed | 3-00-00 | 0-00-00 6-59 |
| Move to minute digits | [SET] | 3-00-00 | 0-00-00 6-59 |
| Minute digits start flashing | Press [+] until "23" is displayed | 3-23-00 | 0-00-00 6-59 |

-continued

Test Timer

| Remarks | Keys to Press | Display will Read | |
|---|---|---|---|
| Move to second digits | [SET] | 3-23-00<br>6-59 | 0-00-00 |
| Second digits start flashing | [SET]<br>(They are already "00") | 3-23-00<br>6-59 | 0-00-00 |
| Start the Timer | [=] (23/37A) | 3-23-00<br>6-59 | 3-22-59 |
| Stop the Timer | [-] (25/37B) | 3-23-00<br>6-59<br>(Counter will Stop) | 3-22-56 |

-continued

Test Timer

| Remarks | Keys to Press | Display will Read | |
|---|---|---|---|
| Start the Timer | [=] | 3-23-00<br>6-59 | 3-22-59 |

To Clear the timer, bring all the timer set digits down to 0-00-00 by using [+] or [-] keys After approximately 10 minutes of none use, the calculator will automatically go to the clock and calendar mode.

Note:

Both [+] or [-] keys can be used for setting digits in the timer, clock, and date.

Keys Utilized Above:
"TIME" (36)
"SET" (23)
"+" (24)
"=" (23/37A)
"−" (25/37B)

EXAMPLES UTILIZING THE MEMORY FUNCTIONS

Memory

| Remarks | Keys to Press | Display will Read | | |
|---|---|---|---|---|
| Go back to Average Mode | [AVG] (30) | Number of Grades | Current Grade | 92.35<br>Grade Average |
| | | 2 | 91.2 | Average Mode |
| Clear Average Mode | [CLR]<br>[AVG] (18) | Number of Grades | Current Grade | 0.00<br>Grade Average |
| | | 0 | 0 | Average Mode |
| Go to Calculator Mode | [AC] (16) | 0. | | |
| Enter "78.90" | [7][8][.][9][0] | 78.9 | | |
| Put in Memory | [M+] (15) | 78.90 M | | |
| Enter "15.24" | [1][5][.][2][4] | 15.24 M | | |
| Add to Memory | [M+] | 15.24 M | | |
| Enter "20.76" | [2][0][.][7][6] | 20.76 M | | |
| Subtract from Memory | [M-] (15) | 20.76 M | | |
| Recall Memory | [MR/C] (15) | 73.38 M | | |
| Clear Memory | [MR/C] | 73.73 | | |
| Clear Calculator | [AC] | 0. | | |

Keys Utilized Above:
"AVG" (30)
"CLR"
AVG (18)
"AC" (16)
Individual Numbers keys (21)
"." (decimal) key (22)
"M+" (First Key On The Left) Of The 'Memory' Keys (15)
"M−" (Middle Key) Of The 'Memory' Keys (15)
"MR" (or "MR/C") (Last Key On The Right) Of The 'Memory' Keys (15)

When turned on, or if in an embodiment where the calculator remains on under energy-saving circuitry and power supply; a "0" or like symbol, is displayed in the upper right portion of the first number display field (1) of the expanded display (33); or adjacent to or under the "9" portion of the index number segments (14). The calculator (10) can, then, be utilized as a standard calculator (within the calculator mode of the invention), for performing various math routines, such as adding, subtracting, multiplying or dividing of a number or numeric value, or integer.

The calculator (10) can, then, also, be shifted into the paper grading mode or grade averaging mode of the invention by pressing the desired mode key. Pressing the "# PROB" key (31) places the calculator (10) in the Grading or Percentage Mode (test grading mode); or pressing the "AVG" key (30) places the calculator (10) in the grade Averaging Mode.

The calculator (10) is designed in preferred embodiments, with regard to utilizing the Averaging Mode, to 'average' up to and including 99 (ninety-nine) grades at a time; or, such that an averaging grade list of 99 grades can be compiled for overall averaging. However, it will be understood, within the scope and spirit of the present invention, that other preferred embodiments of the calculator (10) can enable the user or operator to compile an indexed, averaging grade list of more than 99 grades.

With regard to the Grading Mode (Percentage or Test Grading mode), the calculator (10), in preferred embodiments of the invention, will provide numeric percentage grades (to the nearest whole number) with regard to test-exams having up to and including 999 (Nine Hundred Ninety-Nine) problems, or equal parts constituting the 'whole' the subject of analysis. This is especially important, as teachers often grade hundreds of papers at a time. In this regard, Teachers do not have to calculate each grade personally or search through hard to read 'graphs' or 'tables' to find the correct grade. With the calculator (10) of the present invention, grades for most any test paper are instantly available with only the touch of a few keys, such as the scrolling keys (19) and (20).

Also, with regard to the Averaging Mode, the 'Backspace' key (17) is available to be utilized for clearing or backing out (or backing out through) any displayed number, originally entered for averaging, before it is activated for inclusion in the grade averaging and indexed list of grades to be averaged, by pressing one of the action keys.

Accordingly, the appended claims are intended to cover all changes, modifications and alternative options and embodiments falling within the true breath, scope and spirit of the present invention. The reader is, therefore, requested to determine the scope of the invention by the appended claims and their legal equivalents, and not by the examples which have been given.

What is claimed is:

1. A scroll able percentage and grading list calculator for the determination of a numeric grade of a test-exam, said scrollable percentage and grading list calculator comprising: microprocessing means for providing memory, arithmetic logic, display driver and further internal functions, the microprocessing means being programmed in a grade list mode to analyze a number of problems on a test-exam entered therein, and to contemporaneously provide first and further ranges of number of problems wrong and first and further grade lists setting forth a numerical percentage grade corresponding to each respective number of problems wrong in the range of number of problems wrong, while facilitating the ability to scroll through each of the ranges and the grade lists corresponding thereto; entry means comprising a plurality of key pads, identified, circuited and functionally interfaced in relation to the microprocessing means to activate the program in the grade list mode for analysis and display purposes; and expanded display means functionally interfaced with the microprocessing means for displaying the number of problems on a test-exam and the first and further ranges of number of problems wrong, and for displaying, as corresponding thereto, the first and further grade lists, each of said grade lists being displayed such that each respective grade is positionally adjacent in relation to the next respective grade, in sequence, in the grade list, the expanded display means further indicating each of the grade lists, scrolled to, while contemporaneously indicating the range of number of problems wrong, corresponding thereto, and the number of problems on a test-exam; housing means for supporting and containing the microprocessing means, the entry means and the expanded display means; and power means interfaced with the housing means for activation and function of said scrollable percentage and grading list calculator.

2. The scrollable percentage and grading list calculator of claim 1,
wherein:
the expanded display means further comprising:
a plurality of text message segments; and
a plurality of number display fields.

3. The scrollable percentage and grading list calculator of claim 2,
wherein:
each of the plurality of text message segments is displayed positionally adjacent in relation to one of the plurality of number display fields, and sets forth and constitutes a descriptive indicator, in text form, of the numeric information being displayed in the adjacent number display field.

4. The scrollable percentage and grading list calculator of claim 3,
wherein:
the plurality of number display fields comprises a first number display field, a second number display field, a third number display field and a fourth number display field.

5. The scrollable percentage and grading list calculator of claim 4,
wherein:
the expanded display means further comprises a plurality of index number segments, positioned adjacent to the first number display field.

6. The scrollable percentage and grading list calculator of claim 5,
wherein:
the first number display field comprises a number of sub-display fields, each of said sub-display fields being positionally adjacent to one of the respective index number segments;
the first number display field displaying and indicating one of the,respective, first and further grade lists, each of the sub-display fields indicating and displaying one of the numerical percentage grades of the grade list being displayed and indicated.

7. The scrollable percentage and grading list calculator of claim 6,
wherein:
the first number display field further comprises ten sub-display fields and the plurality of index number segments further comprises ten consecutively number index segments, starting with the numeral, "0", and ending with the numeral, "9".

8. The scrollable percentage and grading list calculator of claim 7,
wherein:
the second number display field displaying and indicating the number of problems on a test-exam, up to and including 999 such problems.

9. The scrollable percentage and grading list calculator of claim 8,
wherein:
the third and fourth number display fields display and indicate one of the first and further ranges of number of problems wrong,
the third number display field displaying and indicating the lowest number of the range of number of problems wrong, and the fourth number display field displaying and indicating the highest number of the range of number of problems wrong.

10. The scrollable percentage and grading list calculator of claim 9,
wherein:
each of the first and further ranges of number of problems wrong is provided in sequences or increments of ten problems wrong, beginning with the sequence of "0" to "9" problems wrong, while remaining consistent, in such sequences, with not providing a range of number of problems wrong which exceeds, or is greater than, the number of problems on a test-exam.

11. The scrollable percentage and grading list calculator of claim 10,
wherein:
the entry means further comprises: a key pad identified for entering the number of problems on a test-exam; a plurality of number entry key pads; and first and further scroll key pads.

12. The scrollable percentage and grading list calculator of claim 11,
wherein:
the microprocessing means is further programmed such that when a number, a whole number up to and including the number "999", is entered, utilizing the number entry key pads, and the key pad identified for entering the number of problems on a test-exam is, then, utilized, the expanded display means displays and indicates, contemporaneously, the first range of number of problems wrong, in the sequence of "0 to 9", and the first grade list of the first ten grades corresponding to the first range of number of problems wrong.

13. The scrollable percentage grading list calculator of claim 12,
wherein:
the first scroll key pad activates a scrolling up function such that sequences higher in numeric range value, in relation to the range of number of problems wrong, then, being displayed, can be accessed in the microprocessor means and displayed on the expanded display means, contemporaneously, with the corresponding grade list; and
wherein:
the further scroll key pad activates a scrolling down function such that sequences lower in numeric range value, in relation to the range of number of problems wrong, then, being displayed, can be accessed in the microprocessor means and displayed on the expanded display means, contemporaneously, with the corresponding grade list.

14. A scrollable grading and averaging calculator for the determination of a numeric grade of a test-exam and for the determination of the overall average of a compiled list of numeric grades, while also providing mathematical calculating and memory storage functions, said scrollable grading and averaging calculator comprising: microprocessing means for providing memory, arithmetic logic, display driver and further internal functions, the microprocessing means being programmed in a grade list mode to analyze a number of problems on a test-exam entered therein, and to contemporaneously provide first and further ranges of number of problems wrong and first and further grade lists setting forth a numerical grade corresponding to each respective number of problems wrong in the range of number of problems wrong, while facilitating the ability to scroll up and down, in terms of numerical value, through each of the ranges and the grade lists corresponding thereto, the microprocessing means further being programmed in an averaging mode to compile, through adding, deleting and editing, a list of grades to be averaged, while setting forth a resulting overall average, and facilitating the ability to scroll up and down, in terms of the index number assigned to a grade, through the respective grades of the list of grades compiled, the microprocessing means further being programmed in a calculator mode to carry out common mathematical operations and to store numeric values, and the microprocessing means further being programmed to singularly activate and utilize the grade list mode, the averaging mode and the calculator mode; entry means comprising a plurality of key pads, identified, circuited and functionally interfaced in relation to the microprocessing means to activate and utilize the programed grade list mode, averaging mode and calculator mode, for analysis and display purposes; expanded display means functionally interfaced with the microprocessing means: for displaying, in the grade list mode, the number of problems on a test-exam and the first and further ranges of number of problems wrong, and for displaying, as corresponding thereto, the first and further grade lists, each of said grade lists being displayed such that each respective grade is positionally adjacent in relation to the next respective grade, in sequence, in the grade list, the expanded display means further indicating each of the grade lists, scrolled to, while contemporaneously indicating the range of number of problems wrong, corresponding thereto, and the number of problems on a test-exam; for displaying, in the averaging mode, the respective grade and the corresponding index number of each of the grades compiled on a list of grades to be averaged, while contemporaneously setting forth and displaying the overall average of the list of grades then entered, and displaying and indicating each of the respective grades scrolled to; and for displaying, in the calculator mode the numeric values entered for arithmetic operation, the resulting numeric value and the memory status of a numeric value entered, deleted or recalled from memory storage; and housing and power means for the support add activation of the microprocessing means, the entry means and the expanded display means of said scrollable grading and averaging calculator.

15. The scrollable grading and averaging calculator of claim 14,
wherein:
the expanded display means further comprising:
a plurality of number display fields for the contemporaneous display of a number of problems on a test-exam, scrolled to, respective, first and further ranges of number of problems wrong and scrolled to, respective first and further grade lists setting forth a numerical grade corresponding to each respective number of problems wrong in the range of number of problems wrong then scrolled to and displayed, each, when in the grade list mode; and contemporaneous display of a respective numeric index number, a respective, scrolled to, grade from a compiled list of grades to be averaged, and a resulting overall average of the compiled list of grades, each, when in the averaging mode; and
a plurality of activatable and displayable text message annunciators, each, positioned respectively, in adjacent positional location in relation to each of the plurality of number display fields, for identifying a respective numeric value being displayed therein.

16. The scrollable grading and averaging calculator of claim 15,
wherein:
the plurality of number display fields comprise a first number display field, a second number display field, a third number display field and a fourth number display field.

17. The scrollable grading and averaging calculator of claim 16,
wherein:
the expanded display means further comprises a plurality of index number segments, positioned in a consecutive number sequence, adjacent to the first number display field.

18. The scroll able grading and averaging calculator of claim 17,
wherein:
the first number display field comprises a plurality of LCD segmented digital display subelements, LCD segmented digital/decimal display subelements and LCD bar display subelements;
the second number display field comprises a plurality of LCD segmented digital display subelements;
the third number display field comprises a plurality of LCD segmented digital/decimal display subelements; and
the fourth number display field comprises a plurality of LCD segmented digital display subelements;
each respective LCD segmented digital display subelement of the plurality of LCD segmented digital display subelements, of each of the first, second and fourth number display fields, being segmented such that segments can be activated and displayed as an integer from "0" to "9";
each respective LCD segmented digital/decimal display subelement of the plurality of LCD segmented digital/decimal display subelements, of the first and third number display field, being segmented such that segments can be activated and displayed as an integer from "0" to "9" and as a decimal point to the right of and adjacent to the integer; and
each LCD bar display subelement of the plurality of LCD bar display subelements, of the first number display field, being contemporaneously activateable and displayable, and respectively comprising a generally vertical line, positioned generally parallel and between selected pairs of said respective LCD segmented digital/decimal display subelements and selected pairs of said respective LCD segmented digital display subelements.

19. The scroll able grading and averaging calculator of claim 18,
wherein:
the plurality of activatable and displayable text message annunciators comprises a first annunciator element positioned on the expanded display means positionally adjacent to the first number display field; second and third annunciator elements positioned on the expanded display means positionally adjacent to the first number display field; fourth and fifth annunciator elements positioned on the expanded display means positionally adjacent to the second number display field; a sixth annunciator element positioned on the expanded display means positionally adjacent to the second number display field; a seventh annunciator element positioned on the expanded display means positionally adjacent to the third and fourth number display fields; eighth and ninth annunciator elements positioned on the expanded display means positionally adjacent to and between the third and fourth number display fields; and a tenth annunciator element positioned on the expanded display means positionally adjacent to the third number display field.

20. The scrollable grading and averaging calculator of claim 19,
wherein:
the first annunciator element displays a text indicia identifying the grade list mode in relation to the first number display field; the second and third annunciator elements each display text indicia identifying, respectively, the overall average of the list of grades in relation to the first number display field, and the averaging mode in relation to the first, second and third number display fields; the fourth and fifth annunciator elements each display text indicia identifying the number of problems wrong, in the grade list mode in relation to the second number display field; the sixth and fourth annunciator elements each display text indicia identifying the index number of each of the grades compiled on a list of grades to be averaged in the averaging mode in relation to the second number display field, the fourth annunciator element in this regard serving in a display capacity to further amplify and describe the sixth annunciator element as it does with respect to the fifth annunciator element; the seventh annunciator element displays text indicia identifying the range of number of problems wrong in the grade list mode in relation to the third and fourth number display fields; the eighth annunciator element displays a text indicia, "To", and a text dash mark, "–", identifying and amplifying the range of number of problems wrong in the grade list mode in relation to the third and fourth number display fields; and the ninth annunciator element displays a text indicia identifying the respective grade scrolled to, as a current grade in the averaging mode in relation to the third number display field.

21. The scrollable grading and averaging calculator or claim 20, wherein:

said plurality of LCD decimal display subelements of the first number display field further comprises first through fourteenth decimal display subelements, said plurality of LCD segmented digital display subelements of the first number display field comprises first through twentieth LCD segmented digital display subelements, and said plurality of LCD bar display subelements of the first number display field further comprises first through ninth LCD bar display subelements;

said plurality of LCD segmented digital display subelements of the second number display field further comprises first through third LCD segmented digital display subelements;

said plurality of LCD segmented digital display subelements of the third number display field further comprises first through third LCD segmented digital display subelements; and said plurality of LCD segmented digital display subelements of the fourth number display field further comprises first through third segmented digital display subelements;

said plurality of LCD decimal display subelements of the third number display field further comprising first through third LCD decimal display subelements.

22. The scrollable grading and averaging calculator of claim 20, wherein:

the plurality of LCD segmented digital display subelements of the first number display field further comprises first, second, third, fourth, fifth and sixth LCD segmented digital display subelements; the plurality of LCD segmented digital/decimal display subelements of the first number display field further comprises first, second, third, fourth, fifth, sixth, seventh, eighth, ninth, tenth, eleventh, twelfth, thirteenth and fourteenth LCD segmented digital/decimal display subelements; and the plurality of LCD bar display subelements of the first number display field further comprises first, second, third, fourth, fifth, sixth, seventh, eighth and ninth LCD bar display subelements;

the plurality of LCD segmented digital display subelements of the second number display field further comprises first, second and third LCD segmented digital display subelements;

the plurality of LCD segmented digital/decimal display subelements of the third number display field further comprises first, second and third LCD segmented digital/decimal display subelements; and the plurality of LCD segmented digital display subelements of the fourth number display field further comprises first, second and third LCD segmented digital display subelements.

23. The scrollable grading and averaging calculator of claim 22, wherein:

the first number display field further comprises first, second, third, fourth, fifth, sixth, seventh, eighth, ninth and tenth numeric subdisplay fields, configurationally positioned, in relation to one another, in a generally horizontal and lengthwise manner;

the first numeric subdisplay field comprising, in sequence, the first LCD segmented digital display subelement and the first LCD segmented digital/decimal display subelement;

the second numeric subdisplay field comprising, in sequence, the second LCD segmented digital display subelement and the second LCD segmented digital/decimal display subelement;

the first LCD bar display subelement being positioned substantially between the first numeric subdisplay field and the second numeric subdisplay field;

the third numeric subdisplay field comprising, in sequence, the third LCD segmented digital subelement and the third LCD segmented digital/decimal display subelement;

the second LCD bar display subelement being positioned substantially between the second numeric subdisplay field and the third numeric subdisplay field;

the fourth numeric subdisplay field comprising, in sequence, the fourth LCD segmented digital display subelement and the fourth LCD segmented digital/decimal display subelement;

the third LCD bar display subelement being positioned substantially between the third numeric subdisplay field and the fourth numeric subdisplay field;

the fifth numeric subdisplay field comprising, in sequence, the fifth LCD segmented digital display subelement and the fifth LCD segmented digital/decimal display subelements;

the fourth LCD bar display subelement being positioned substantially between the fourth numeric subdisplay field and the fifth numeric subdisplay field;

the sixth numeric subdisplay field comprising, in sequence, the sixth LCD segmented digital display subelement and the sixth LCD segmented digital/decimal display subelement;

the fifth bar display subelement being positioned substantially between the fifth numeric subdisplay field and the sixth numeric subdisplay field;

the seventh numeric subdisplay field comprising, in sequence, the seventh LCD segmented digital/decimal display subelement and the eighth LCD segmented digital/decimal display subelement;

the sixth bar display subelement being positioned substantially between the sixth numeric subdisplay field and the seventh numeric subdisplay field;

the eighth numeric subdisplay field comprising, in sequence, the ninth LCD segmented digital/decimal display subelement and the tenth LCD segmented digital/decimal display subelement;

the seventh bar display *subelement being positioned substantially between the seventh numeric subdisplay field and the eighth numeric subdisplay field;

the ninth numeric subdisplay field comprises, in sequence, the eleventh LCD segmented digital/decimal display subelement and the twelfth LCD segmented digital/decimal display subelement;

the eighth bar display subelement being positioned substantially between the eighth numeric subdisplay field and the ninth numeric subdisplay field; and the tenth numeric subdisplay field comprises, in sequence, the thirteenth LCD segmented digital/decimal display subelement and the fourteenth LCD segmented digital/decimal display subelement, the ninth bar display subelement being positioned substantially between the ninth numeric subdisplay field and the tenth numeric subdisplay field.

24. The scrollable grading and averaging calculator of claim 23, wherein:
the first, second and third LCD segmented digital display subelements of the second display field are positioned, configurationally, in an adjacent consecutive horizontal and lengthwise manner, adjacent to and spaced from the first number display field;
the first, second and third LCD segmented digital/decimal display subelements of the third number display field are positioned, configurationally, in an adjacent consecutive horizontal and lengthwise manner, adjacent to and spaced from the first and second number display fields; and
the first, second and third LCD segmented digital display subelements of the fourth number display field are positioned, configurationally, in an adjacent consecutive horizontal and lengthwise manner, substantially parallel to and spaced from the third number display field.

25. The scrollable grading and averaging calculator of claim 24, wherein:
in the grade list mode, the number of problems on a test-exam is entered into the microprocessing means, utilizing the entry means, the number of problems being a selected number, within the whole numbers in a range of 1 to 999, and upon entry thereof, the number of problems on a text-exam being displayed on the second number display field, utilizing the first, second and third LCD segmented digital display subelements, as needed, in accordance with the selected number of problems on a test-exam entered.

26. The scrollable grading and averaging calculator of claim 25, wherein:
in the averaging mode, the index number of each of the grades compiled on a list of grades to be averaged, being a whole number in the range from 1 to 99, is displayed, respectively, as scrolled to, on the second number display field, utilizing the second and third LCD segmented digital display subelements, as needed, in accordance with the number of respective grades and corresponding index number entered by the entry means.

27. The scrollable grading and averaging calculator of claim 26, wherein:
in the grade list mode, the third and fourth number display fields display and indicate one of the first and further ranges of number of problems wrong,
the third number display field displaying and indicating the lowest number of the range of number of problems wrong, using, as needed, the first, second and third LCD segmented digital/decimal display subelements of said third number display field, and
the fourth number display field displaying and indicating the highest number of the range of number of problems wrong, using, as needed, the first, second and third LCD segmented digital display subelements of said fourth number display field.

28. The scrollable grading and averaging calculator of claim 27, wherein:
in the grade list mode, each of the first and further ranges of number of problems wrong is provided in sequences or increments of ten problems wrong, beginning with the sequence of "0" to "9" problems wrong, while remaining consistent, in such sequences, with not providing a range of number of problems wrong which exceeds, or is greater than, the number of problems on a test-exam.

29. The scrollable grading and averaging calculator of claim 28, wherein:
in the averaging mode, displaying in the third number display field each of the respective grades, as entered and scrolled to, of the grades compiled on a list of grades to be averaged, utilizing, therefor, the first, second and third LCD segmented digital/decimal display subelements of said third number display field, as needed, in accordance with a number and decimal point so entered, constituting the respective grade.

30. The scrollable grading and averaging calculator of claim 29, wherein:
in the grade list mode, the first number display field displaying and indicating one of the, respective, first and further grade lists,
each of the subdisplay fields indicating and displaying one of the respective grades of the first and further grade lists, as displayed and scrolled to.

31. The scroll able grading and averaging calculator of claim 30, wherein:
the first number display field further comprises a plurality of index number segments, comprising ten consecutively numbered index segments, starting with the numeral, "0" and ending with the numeral "9"; and wherein:
each of the subdisplay fields of the first number display field substantially align in positional display with a respective index segment.

32. The scrollable grading and averaging calculator of claim 31, wherein:
in the averaging mode, the first number display field displaying and indicating the overall average of the list of grades then entered, utilizing two of the respective subdisplay fields, as needed, of the first number display field.

33. The scrollable grading and averaging calculator of claim 32, wherein:
the entry means further comprises a plurality of number entry keys, including numeral, zero and decimal keys, for optionably entering numbers with preselected zero's and decimal marks, as respectively selected, into the grade list mode, the averaging mode and the calculator mode of the microprocessing means,
the entry means further comprises up and down scroll key pads, for displaying up to ten grades at a time from the first and further grade lists in the grade list mode; and for functioning in the averaging mode to, respectively, scroll up and down the list of grades to be averaged in the averaging mode.

34. The scrollable grading and averaging calculator of claim 33, wherein:
the entry means further comprises a Number of Problems key pad for entering the number of problems, as entered by the number entry keys, on a test-exam, for display in the second number display field, and the entry means further comprising a Average key pad, an Add Grade key pad, a Delete Grade key pad and a Clear Average key pad, for use in the averaging mode, the Average key pad functioning to switch to and activate the averaging mode, the Add Grade key pad functioning to enter onto the list of grades to be averaged a numeric value entered on the third number display field with the number entry keys, and, in so doing assigning the next consecutive index number thereto to appear in the second number display field, the Delete Grade key pad functioning when pressed to delete a specific grade displayed in the third number display field, and, when pressed, also deleting the corresponding index number or moving the next respective grade up the list, down to occupy the position of the grade just deleted, and the Clear Average key pad functioning to delete and clear all of the grades previously compiled on a list of grades to be averaged, such that a new list of grades to be averaged can be compiled.

35. The scrollable grading and averaging calculator of claim 34,
wherein:
the microprocessing means further programmed in a Time Mode such that time and date can be provided on the expanded display means, and such that the entry means can be utilized to activate the display of starting and finishing or completion times, for measuring time sequences related to activities calling for the amount of time expended.

36. A grading display and averaging calculator assembly for numeric analysis of test grade scores and other numbers symbolizing a whole, and for providing an overall average of a list of grades compiled through entry and editing by an operator, said grading display and averaging calculator assembly comprising:

a keypad subassembly means for entering the number of problems on a test-exam and activating a grade list mode, for entering numerals, zero's and decimals as selected in the grade list mode, an averaging mode and a calculator mode, for entry of a number to be averaged, activation of the averaging mode, deletion of a respective grade entered for averaging and clearing of all numbers compiled on a list of grades to be averaged, and for scrolling up and down a grade list in the grade list mode, and up and down the list of grades to be averaged in the averaging mode, a microprocessor subassembly for processing and generation of digital information, and for providing programmed and programmable memory, RAM and ROM functions, arithmetic logic, display driver and further internal functions, the microprocessing subassembly being programmed in a grade list mode to analyze a number of problems or equal parts of a test-exam or whole entered therein, and to contemporaneously provide first and further ranges of number of problems wrong and first and further grade lists setting forth a plurality of numerical grades, respectively corresponding to each respective number of problems wrong in the range of number of problems wrong, while facilitating the ability to scroll up and down in numerical value through each of the ranges and the grade lists corresponding thereto, the microprocessing subassembly further being programmed in a averaging mode to compile through adding, deleting and editing, a list of grades to be averaged, while setting forth a resulting overall average, and facilitating the ability to scroll up and down the list of grades to be averaged by moving up and down from a respective index number assigned to a respective grade to be averaged in the list of grades to be averaged, and the microprocessing subassembly further being programmed in a calculator mode to carry out mathematical operations and to store numeric values, and being programmed to singularly activate and utilize the grade list mode, the averaging mode and the calculator mode, the keypad subassembly means comprising a plurality of keypads identified, circuited and functionally interfaced in relation to the microprocessor subassembly to activate and utilize the programmed, grade list mode, averaging mode and calculator mode, for analysis and display purposes;

a visual display subassembly having accessible first, second, third and fourth number display fields, the first number display field having ten respective subdisplay fields, each of the respective subdisplay fields having two digital space areas for selective display of an integer, or an integer and a decimal point, each of the subdisplay fields being utilized to display a respective grade of the first and further grade lists, in the grade list mode, and to display first and further grade lists, of ten grades each, as scrolled to, on each of the ten subdisplay fields at a given time, the first number display field further functioning to display and present, utilizing two of it subdisplay fields, the overall average, in the list of grades to be averaged, in the averaging mode, and through utilizing a plurality of the subdisplay fields, to present numeric values of operation in the calculator mode, the visual display subassembly being functionally interfaced with the microprocessing means, for displaying numbers and numeric values in the grade list mode, the averaging mode and the calculator mode, the second number display field functioning to display the number of problems in the grade list mode, and index number of a respective grade on the list of grades to be averaged in the averaging mode, the second number display field having three digital space areas, each, for selective display of an integer, the third number display field functioning to display a lower numeric value, of the respective first and further ranges of number of problems wrong, respectively scrolled to in the grade list mode, and to display the numeric value of a respective grade entered on the list of grades to be averaged in the averaging mode, the third number display field having three digital space areas for selective display of an integer and decimal point, the fourth number display field functioning to display a higher numeric value of the respective first and further ranges of number of problems wrong, respectively scrolled to in the grade list mode, the fourth number display field having three digital space areas for selective display of an integer, the first, second, third and fourth number display fields operating and displaying numeric values in the grade list mode, and the first, second and third number display fields operating and displaying numeric values in the averaging mode;

housing subassembly means for enclosure and support; and power means for activation of the grading display and averaging calculator.

37. The grading display and averaging calculator assembly of claim 36, wherein:

the microprocessor subassembly comprises one microprocessing chip.

38. The grading display and averaging calculator assembly of claim 37, wherein:

the microprocessor subassembly is further provided Clock/Timer means and the microprocessor subassembly is further programmed in a Time mode for providing date and time information, and for timing and measuring the time expired in an activity or event, the first, third and fourth number display fields displaying and indicating numeric information in the Time mode.

39. The grading display and averaging calculator assembly of claim 36, wherein:

the microprocessor subassembly comprises a first microprocessing chip and a co-processing chip.

40. A grading display calculator assembly for numeric analysis of test grade scores and equal parts of a whole by an operator, said grading display calculator assembly comprising:

an entry subassembly having a plurality of function keys, identified, circuited and interfaced in relation to processor means for entry of the number of problems and parts, respectively, of a test-exam and whole;

processor means for processing and generation of digital information and scrolling of respective, first and further ranges of a number of problems wrong and corresponding respective first and further grade lists, setting forth a plurality of percentage grades, each related to one of the respective number of problems wrong in the respective ranges of number of problems wrong, each of the function keys of said entry subassembly being functionally and activatably connected with said processor means;

a memory subassembly, comprising ROM and RAM means, for preselected storage of software programs, and entry and storage of numeric values and calculated numeric values, respectively;

a display controller, structurally interfaced with the processor means, for interpreting digital information form the processor means for visual display purposes;

a visual display subassembly having first and further display fields, the first display field having means of illuminating, presenting and displaying a plurality of respective percentage grade values for each first and further grade list respectively scrolled to, displaying the plurality of respective percentage respective grade values for each of the first and further grade lists, in adjacent positional relationship to one another;

the display controller being functionally interfaced with the processor means and the visual display subassembly, for interpreting digital information from the processor means for presentation on the visual display subassembly;

housing subassembly means; and power means for activation thereof.

41. The grading display calculator assembly of claim 40, wherein:

the grading display calculator assembly further comprising a clock/timer means, interfaced with the processor means, for continuously monitoring time, and an alarm element for alerting an operator to certain conditions.

\* \* \* \* \*